US012785854B2

(12) United States Patent
Yang et al.

(10) Patent No.: US 12,785,854 B2
(45) Date of Patent: Nov. 3, 2026

(54) TECHNIQUES FOR APPLYING SYSTEMATIC POLAR CODES FOR JOINT SOURCE AND CHANNEL CODING (JSCC)

(71) Applicant: QUALCOMM Incorporated, San Diego, CA (US)

(72) Inventors: Wei Yang, San Diego, CA (US); Kirill Ivanov, La Jolla, CA (US); Pinar Sen, San Diego, CA (US); Gabi Sarkis, San Diego, CA (US); Amira Alloum, Boulogne Billancourt (FR); Jing Jiang, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 81 days.

(21) Appl. No.: 18/656,088

(22) Filed: May 6, 2024

(65) Prior Publication Data

US 2025/0343627 A1 Nov. 6, 2025

(51) Int. Cl.
*H04L 1/00* (2006.01)

(52) U.S. Cl.
CPC .......... *H04L 1/0057* (2013.01); *H04L 1/0054* (2013.01); *H04L 1/0076* (2013.01)

(58) Field of Classification Search
CPC .... H04L 1/0057; H04L 1/0054; H04L 1/0076
USPC .................................................. 714/752, 776
See application file for complete search history.

(56) References Cited

U.S. PATENT DOCUMENTS

| | | | | |
|---|---|---|---|---|
| 10,312,948 B1 * | 6/2019 | Arikan | .............. | H03M 13/6362 |
| 11,070,237 B2 * | 7/2021 | Li | ..................... | H03M 13/2906 |
| 2013/0283116 A1 * | 10/2013 | Arikan | .................. | H04L 1/0041<br>714/752 |

(Continued)

FOREIGN PATENT DOCUMENTS

| | | |
|---|---|---|
| CN | 111200444 A | 5/2020 |
| WO | WO-2023155650 A1 | 8/2023 |

OTHER PUBLICATIONS

Bioglio V., et al., "Low-Complexity Puncturing and Shortening of Polar Codes", arxiv.org, Cornell University Library, 201 Olin Library, Cornell University Ithaca, 2017 IEEE Wireless Communications and Networking Conference Workshops (WCNCW), IEEE, NY 14853, Jan. 23, 2017, Mar. 19, 2017, 6 Pages, XP080750896, XP033093160, The Whole Document.

(Continued)

*Primary Examiner* — Albert Decady
*Assistant Examiner* — Osman M Alshack
(74) *Attorney, Agent, or Firm* — Holland & Hart LLP

(57) ABSTRACT

Methods, systems, and devices for wireless communications are described. In some cases, a first wireless device may communicate, with a second wireless device, a control signal indicating a systematic polar code configuration, the systematic polar code configuration indicating for the first wireless device to perform systematic polar encoding on a first set of bits associated with a non-uniform bit distribution. As such, the first wireless device may apply a systematic polar code to the first set of bits to generate a systematic polar codeword based on the systematic polar code configu-
(Continued)

ration. In such cases, the systematic polar codeword may include a set of parity bits and a set of systematic bits. Thus, the first wireless device may transmit at least the set of parity bits of the systematic polar code.

18 Claims, 13 Drawing Sheets

(56) References Cited

U.S. PATENT DOCUMENTS

| | | | | |
|---|---|---|---|---|
| 2015/0077277 | A1* | 3/2015 | Alhussien | H03M 13/611 341/67 |
| 2019/0081646 | A1* | 3/2019 | Bioglio | H03M 13/6362 |
| 2019/0165887 | A1* | 5/2019 | Arikan | H03M 13/1148 |
| 2019/0215105 | A1* | 7/2019 | Xu | H04L 1/0009 |
| 2019/0349141 | A1* | 11/2019 | Ahn | H04L 1/1861 |
| 2020/0021309 | A1* | 1/2020 | Xu | H03M 13/1111 |
| 2020/0092048 | A1* | 3/2020 | Hong | H04L 5/0055 |
| 2022/0263694 | A1* | 8/2022 | Iscan | H04L 25/03929 |
| 2023/0033774 | A1 | 2/2023 | Koike-Akino et al. | |
| 2024/0063815 | A1* | 2/2024 | Sahin | H03M 13/09 |
| 2025/0048178 | A1 | 2/2025 | Berger et al. | |
| 2025/0096930 | A1 | 3/2025 | Berger et al. | |

OTHER PUBLICATIONS

International Search Report and Written Opinion—PCT/US2025/027736—ISA/EPO—Aug. 26, 2025.

* cited by examiner

TECHNIQUES FOR APPLYING SYSTEMATIC POLAR CODES FOR JOINT SOURCE AND CHANNEL CODING (JSCC)

FIELD OF TECHNOLOGY

The following relates to wireless communications, including techniques for applying systematic polar codes for joint source and channel coding (JSCC).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for applying systematic polar codes for joint source and channel coding (JSCC). Generally, the techniques described herein may enable a first wireless device to apply a systematic polar code to a set of bits associated with a non-uniform distribution. For example, the first wireless device may communicate, with a second wireless device, a control signal indicating a systematic polar code configuration, the systematic polar code configuration indicating for the first wireless device to perform systematic polar encoding on a first set of bits associated with a non-uniform bit distribution. As such, the first wireless device may apply a systematic polar code to the first set of bits to generate a systematic polar codeword based on the systematic polar code configuration. In such cases, the systematic polar codeword may include a set of parity bits and a set of systematic bits. Thus, the first wireless device may transmit at least the set of parity bits of the systematic polar codeword.

For example, in some cases, the first wireless device may transmit the systematic codeword including the set of parity bits and the set of systematic bits. In some other examples, the first wireless device may puncture a first subset of the set of systematic bits from the systematic polar codeword, such that the first wireless device transmits the set of parity bits and a second subset of the set of parity bits. In some other examples, the first wireless device may puncture all of the set of systematic bits from the systematic polar codeword, such that the first wireless device transmits the set of parity bits (e.g., without any systematic bits).

A method for wireless communications by a first wireless device is described. The method may include communicating, with a second wireless device, a control signal indicating a systematic polar code configuration, the systematic polar code configuration indicating for the first wireless device to perform systematic polar encoding on a first set of multiple bits associated with a non-uniform bit distribution, applying a systematic polar code to the first set of multiple bits to generate a systematic polar codeword based on the systematic polar code configuration, the systematic polar codeword including a set of multiple parity bits and a set of multiple systematic bits, and transmitting at least the set of multiple parity bits of the systematic polar codeword.

A first wireless device for wireless communications is described. The first wireless device may include one or more memories storing processor executable code, and one or more processors coupled with the one or more memories. The one or more processors may individually or collectively be operable to execute the code to cause the first wireless device to communicate, with a second wireless device, a control signal indicating a systematic polar code configuration, the systematic polar code configuration indicating for the first wireless device to perform systematic polar encoding on a first set of multiple bits associated with a non-uniform bit distribution, apply a systematic polar code to the first set of multiple bits to generate a systematic polar codeword based on the systematic polar code configuration, the systematic polar codeword including a set of multiple parity bits and a set of multiple systematic bits, and transmit at least the set of multiple parity bits of the systematic polar codeword.

Another first wireless device for wireless communications is described. The first wireless device may include means for communicating, with a second wireless device, a control signal indicating a systematic polar code configuration, the systematic polar code configuration indicating for the first wireless device to perform systematic polar encoding on a first set of multiple bits associated with a non-uniform bit distribution, means for applying a systematic polar code to the first set of multiple bits to generate a systematic polar codeword based on the systematic polar code configuration, the systematic polar codeword including a set of multiple parity bits and a set of multiple systematic bits, and means for transmitting at least the set of multiple parity bits of the systematic polar codeword.

A non-transitory computer-readable medium storing code for wireless communications is described. The code may include instructions executable by one or more processors to communicate, with a second wireless device, a control signal indicating a systematic polar code configuration, the systematic polar code configuration indicating for the first wireless device to perform systematic polar encoding on a first set of multiple bits associated with a non-uniform bit distribution, apply a systematic polar code to the first set of multiple bits to generate a systematic polar codeword based on the systematic polar code configuration, the systematic polar codeword including a set of multiple parity bits and a set of multiple systematic bits, and transmit at least the set of multiple parity bits of the systematic polar codeword.

In some examples of the method, first wireless devices, and non-transitory computer-readable medium described herein, transmitting at least the first set of multiple bits may include operations, features, means, or instructions for transmitting the systematic polar codeword including the set of multiple parity bits and the set of multiple systematic bits.

In some examples of the method, first wireless devices, and non-transitory computer-readable medium described herein, the systematic polar code configuration further indicates for the first wireless device to puncture a first subset of the set of multiple systematic bits of the systematic polar codeword and the method, apparatuses, and non-transitory computer-readable medium may include further operations, features, means, or instructions for puncturing the first subset of the set of multiple systematic bits from the systematic polar codeword based on the systematic polar code configuration, where the set of multiple parity bits and a second subset of the set of multiple systematic bits of the systematic polar codeword may be transmitted based on the first subset of the set of multiple systematic bits being punctured from the systematic polar codeword.

In some examples of the method, first wireless devices, and non-transitory computer-readable medium described herein, the systematic polar code configuration indicates for the first wireless device to puncture all of the set of multiple systematic bits and the set of multiple parity bits may be transmitted based on the set of multiple systematic bits being punctured from the systematic polar codeword in accordance with the systematic polar code configuration.

In some examples of the method, first wireless devices, and non-transitory computer-readable medium described herein, the systematic polar code configuration further indicates for the first wireless device to puncture the first subset of the set of multiple systematic bits associated with a first level of non-uniform bit distribution satisfying a threshold level of non-uniform bit distribution, the set of multiple parity bits and a second subset of the set of multiple systematic bits may be transmitted based on the first subset of the set of multiple systematic bits being punctured from the systematic polar codeword in accordance with the systematic polar code configuration, and the second subset of the set of multiple systematic bits may be associated with a second level of non-uniform bit distribution that does not satisfy the threshold level of non-uniform bit distribution.

In some examples of the method, first wireless devices, and non-transitory computer-readable medium described herein, the first subset of the set of multiple systematic bits may be associated with control information.

In some examples of the method, first wireless devices, and non-transitory computer-readable medium described herein, the systematic polar code configuration further indicates one or more fields of control information, a type of control information, or both, to puncture and the first subset of the set of multiple systematic bits may be associated with the one or more fields, the type of control information, or both.

In some examples of the method, first wireless devices, and non-transitory computer-readable medium described herein, the one or more fields include a modulation and encoding scheme field, a time domain resource allocation field, a frequency domain resource allocation field, a rank field, a precoding matrix indicator field, or any combination thereof.

In some examples of the method, first wireless devices, and non-transitory computer-readable medium described herein, one or more cyclic redundancy check bits associated with the set of multiple parity bits may be not punctured from the systematic polar codeword based on the systematic polar code configuration.

Some examples of the method, first wireless devices, and non-transitory computer-readable medium described herein may further include operations, features, means, or instructions for communicating a second control signal indicating the non-uniform bit distribution associated with the first set of multiple bits.

In some examples of the method, first wireless devices, and non-transitory computer-readable medium described herein, the non-uniform bit distribution may be based on residual redundancy after source coding at an application layer of the first wireless device.

A method for wireless communications by a second wireless device is described. The method may include communicating, with a first wireless device, a control signal indicating a systematic polar code configuration, the systematic polar code configuration indicating for the first wireless device to perform systematic polar encoding on a first set of multiple bits associated with a non-uniform bit distribution, receiving at least a set of multiple parity bits of a systematic polar codeword, where the set of multiple parity bits are based on the first set of multiple bits associated with the non-uniform bit distribution, and decoding the set of multiple parity bits to identify the first set of multiple bits of the systematic polar codeword.

A second wireless device for wireless communications is described. The second wireless device may include one or more memories storing processor executable code, and one or more processors coupled with the one or more memories. The one or more processors may individually or collectively be operable to execute the code to cause the second wireless device to communicate, with a first wireless device, a control signal indicating a systematic polar code configuration, the systematic polar code configuration indicating for the first wireless device to perform systematic polar encoding on a first set of multiple bits associated with a non-uniform bit distribution, receive at least a set of multiple parity bits of a systematic polar codeword, where the set of multiple parity bits are based on the first set of multiple bits associated with the non-uniform bit distribution, and decode the set of multiple parity bits to identify the first set of multiple bits of the systematic polar codeword.

Another second wireless device for wireless communications is described. The second wireless device may include means for communicating, with a first wireless device, a control signal indicating a systematic polar code configuration, the systematic polar code configuration indicating for the first wireless device to perform systematic polar encoding on a first set of multiple bits associated with a non-uniform bit distribution, means for receiving at least a set of multiple parity bits of a systematic polar codeword, where the set of multiple parity bits are based on the first set of multiple bits associated with the non-uniform bit distribution, and means for decoding the set of multiple parity bits to identify the first set of multiple bits of the systematic polar codeword.

A non-transitory computer-readable medium storing code for wireless communications is described. The code may include instructions executable by one or more processors to communicate, with a first wireless device, a control signal indicating a systematic polar code configuration, the systematic polar code configuration indicating for the first wireless device to perform systematic polar encoding on a first set of multiple bits associated with a non-uniform bit distribution, receive at least a set of multiple parity bits of a systematic polar codeword, where the set of multiple parity bits are based on the first set of multiple bits associated with the non-uniform bit distribution, and decode the set of multiple parity bits to identify the first set of multiple bits of the systematic polar codeword.

Some examples of the method, second wireless devices, and non-transitory computer-readable medium described herein may further include operations, features, means, or instructions for decoding the systematic polar codeword may be based on a first LLR associated with the set of multiple parity bits and a second LLR associated with at least a first subset of a set of multiple systematic bits, the at least first subset of the set of multiple systematic bits based on the systematic polar code configuration.

In some examples of the method, second wireless devices, and non-transitory computer-readable medium described herein, the first LLR associated with the set of multiple parity bits may be based on a channel LLR of a channel used to receive the systematic polar codeword.

In some examples of the method, second wireless devices, and non-transitory computer-readable medium described herein, receiving at least the first set of multiple bits may include operations, features, means, or instructions for receiving the systematic polar codeword including the set of multiple parity bits and a set of multiple systematic bits.

In some examples of the method, second wireless devices, and non-transitory computer-readable medium described herein, decoding the systematic polar codeword may include operations, features, means, or instructions for decoding the systematic polar codeword to identify the first set of multiple bits based on a first LLR associated with the set of multiple parity bits and a second LLR associated with the set of multiple systematic bits.

In some examples of the method, second wireless devices, and non-transitory computer-readable medium described herein, the second LLR associated with the set of multiple systematic bits may be based on a ratio of a first probability of a first potential value of each of the set of multiple systematic bits relative to a second probability of a second potential value of each of the set of multiple systematic bits.

In some examples of the method, second wireless devices, and non-transitory computer-readable medium described herein, the systematic polar code configuration further indicates for the first wireless device to puncture a set of multiple systematic bits, the set of multiple systematic bits may be based on the systematic polar code configuration, and decoding the systematic polar codeword may be based on a first LLR associated with the set of multiple parity bits and a second LLR associated with the set of multiple systematic bits.

In some examples of the method, second wireless devices, and non-transitory computer-readable medium described herein, the second LLR associated with the set of multiple systematic bits may be based on a ratio of a first probability of a first potential value of each of the set of multiple systematic bits relative to a second probability of a second potential value of each of the set of multiple systematic bits.

In some examples of the method, second wireless devices, and non-transitory computer-readable medium described herein, receiving at least the first set of multiple bits may include operations, features, means, or instructions for receiving the systematic polar codeword including the set of multiple parity bits and a second subset of the set of multiple systematic bits, where the second subset of the set of multiple systematic bits may be associated with a second level of non-uniform bit distribution that does not satisfy the threshold level of non-uniform bit distribution.

Some examples of the method, second wireless devices, and non-transitory computer-readable medium described herein may further include operations, features, means, or instructions for decoding the systematic polar codeword may be based on a first LLR associated with the set of multiple parity bits and a second LLR associated with the first subset of the set of multiple systematic bits.

In some examples of the method, second wireless devices, and non-transitory computer-readable medium described herein, the second LLR associated with the first subset of the set of multiple systematic bits may be based on a ratio of a first probability of a first potential value of each of the first subset of the set of multiple systematic bits relative to a second probability of a second potential value of each of the first subset of the set of multiple systematic bits.

In some examples of the method, second wireless devices, and non-transitory computer-readable medium described herein, the first subset of the set of multiple systematic bits may be associated with control information.

In some examples of the method, second wireless devices, and non-transitory computer-readable medium described herein, the systematic polar code configuration further indicates one or more fields of control information, a type of control information, or both, to puncture and the first subset of the set of multiple systematic bits may be associated with the one or more fields, the type of control information, or both.

In some examples of the method, second wireless devices, and non-transitory computer-readable medium described herein, the one or more fields include a modulation and encoding scheme field, a time domain resource allocation field, a frequency domain resource allocation field, a rank field, a precoding matrix indicator field, or any combination thereof.

Some examples of the method, second wireless devices, and non-transitory computer-readable medium described herein may further include operations, features, means, or instructions for communicating a second control signal indicating the non-uniform bit distribution associated with the first set of multiple bits.

In some examples of the method, second wireless devices, and non-transitory computer-readable medium described herein, the non-uniform bit distribution may be based on residual redundancy after source coding at an application layer of the first wireless device.

DETAILED DESCRIPTION

Figure 1:
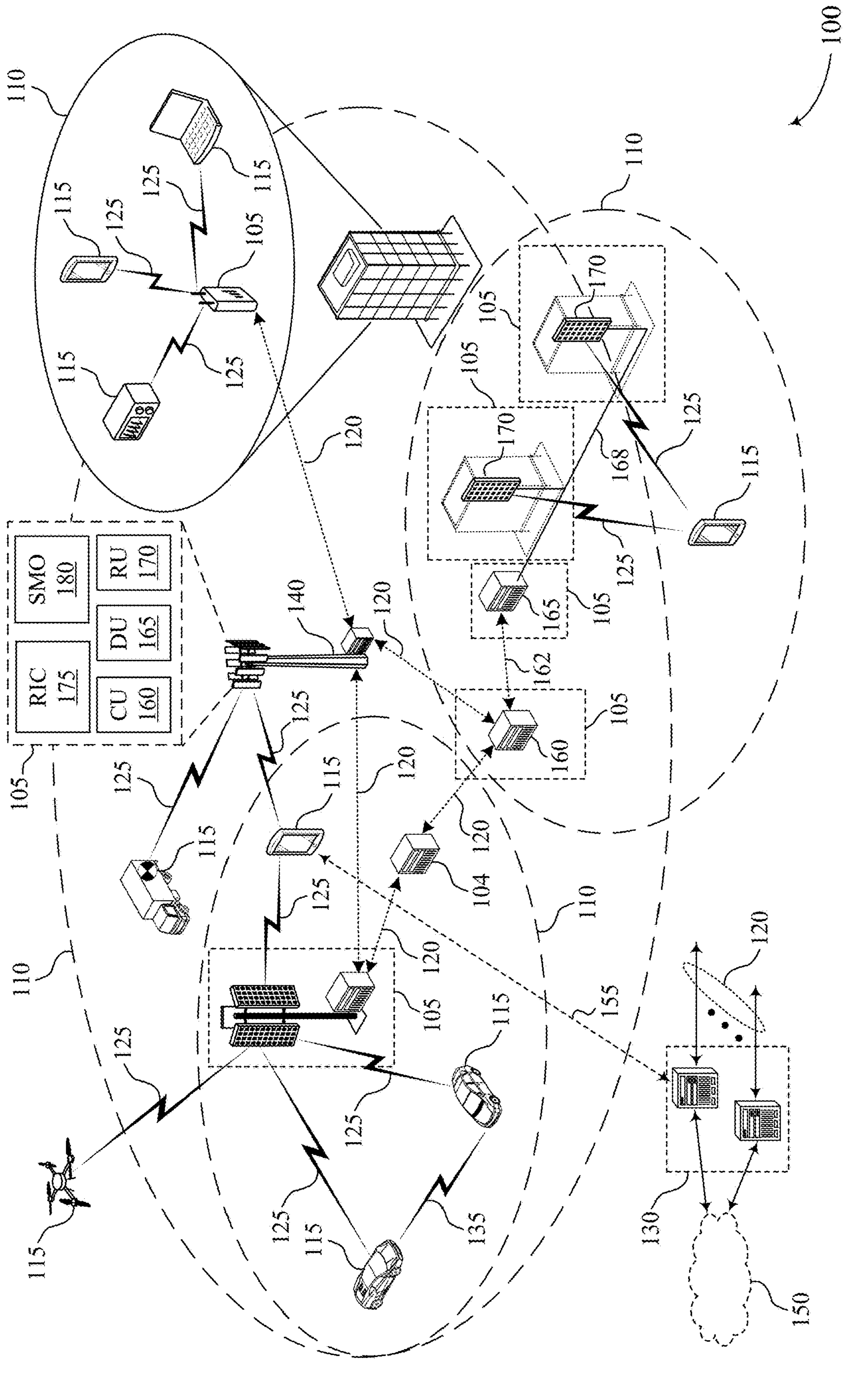
FIG. 1 shows an example of a wireless communications system that supports techniques for applying systematic polar codes for joint source and channel coding (JSCC) in accordance with one or more aspects of the present disclosure.

In some wireless communications systems, residual redundancy may be introduced to information payloads (e.g., at a physical layer of a wireless device) due to source coding of information bits in the information payloads (e.g., at an application layer of the wireless device). In some cases, the residual redundancy may result in a non-uniform probability associated with a set of information bits of the information payload, such that some information bits may be more likely (e.g., associated with a higher probability) than other information bits. In such cases, the non-uniform probability may be referred to as a non-uniform distribution and the information payload may be referred to as a non-uniform source. To encode a non-uniform source, the wireless device may apply a polar code to the non-uniform source, such that a second wireless device may decode the polar encoded non-uniform source based on a probability of the non-uniform distribution. However, successive cancellation list (SCL) decoders (e.g., at wireless devices, such as the second wireless device) may be unable to support (e.g., have limited capabilities to support) non-uniform sources due to the probability of the associated non-uniform distributions being associated with the entirety of the non-uniform sources. That is, SCL decoders may use a probability of a non-uniform distribution in a localized manner rather than a global manner, decreasing decoder performance Accordingly, techniques described herein may support application of systematic polar codes to non-uniform sources. For example, a first wireless device (e.g., an encoder at the first wireless device) may apply a systematic polar code to a non-uniform source to generate a systematic polar codeword including multiple parity bits and multiple systematic bits. In some cases, the first wireless device may transmit the systematic polar codeword including both the parity bits and the systematic bits, such that a second wireless device (e.g., a decoder at the second wireless device) may decode the systematic polar codeword using a first log likelihood ratio (LLR) associated with the parity bits and a second LLR associated with the systematic bits.

In some other cases, the first wireless device may puncture at least a subset of the systematic bits and may transmit the systematic polar codeword including the parity bits and the remaining (e.g., non-punctured) systematic bits. In such cases, the second wireless device may decode the systematic polar codeword using a first LLR associated with the parity bits and a second LLR associated with the punctured systematic bits. For example, the first wireless device may puncture a first subset of the systematic bits, such that the transmitted systematic polar codeword includes the parity bits and a second subset of the systematic bits. In such cases, the second LLR used to decode the systematic polar codeword may be associated with the first subset of systematic bits. In some other examples, the first wireless device may puncture all of the systematic bits, such that the transmitted systematic polar codeword includes (e.g., only) the parity bits. In such cases, the second LLR used to decode the systematic polar codeword may be associated with the systematic bits.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to techniques for applying systematic polar codes for JSCC.

FIG. 1 shows an example of a wireless communications system 100 that supports techniques for applying systematic polar codes for JSCC in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless devices of the wireless communications system 200, such as UEs 115, network entities 105, or both, may perform polar encoding (e.g., may apply polar codes). For example, a first wireless device may have data stored in memory to transmit to another wireless communication device, such as a second wireless device. To initiate the transmission process, the first wireless device may retrieve the data for transmission from the memory. The data may include a quantity of payload bits, 'A,' which may be 1s or 0s, provided from the memory to an encoder of the first wireless device. In some examples, these payload bits may be combined with a quantity (such as a number) of parity or error checking bits, 'E,' to form a total set of information bits, 'A+E.' The quantity of information bits may be represented as a value 'K.' The encoder may implement a polar code with a block length, 'N,' for encoding the information bits. In some examples, N may be different than or the same as K. Such a polar code may be referred to as an (N, K) polar code. In some examples, the bits that are not allocated as information bits (e.g., such as N−K bits) may be assigned as frozen bits.

In some examples, to perform a polar coding operation, the encoder may generate a codeword of length, 'M'. In some examples, M may be a power of 2 (e.g., that is $M=2^m$, where m is an integer value). In some examples, if N is not a power of 2, the encoder may round the value of N up to a nearest valid M value. The encoder may apply (e.g., implement) an ($M=2^m$, K) polar code to the set of information bits, represented by an input sequence vector, 'u,' to generate a codeword, 'c,' according to Equation 1:

$$c = u\begin{pmatrix} 1 & 0 \\ 1 & 1 \end{pmatrix}^{\otimes m} \tag{1}$$

where bits $u_i$ of the input sequence vector may either be information bits (e.g., carrying payload) or frozen bits (e.g., $u_i=0$). In such cases, the matrix $$\begin{pmatrix} 1 & 0 \\ 1 & 1 \end{pmatrix}^{\otimes m}$$

may polarizes $2^m$ copies of a channel W into subchannels $W^i$ that are either almost noisy (e.g., $(I(W^i))\rightarrow 0$) or almost noiseless (e.g., $(I(W^i))\rightarrow 1$). The information bits, $i_0, \ldots i_{K-1}$, may correspond to the K largest capacities $I(W^i)$. For example, if N=400, the encoder may determine a codeword length of M=512 (e.g., the nearest valid value for M greater than or equal to N) to support polar coding. In these examples, the encoder may encode a codeword of length M, and then may puncture or shorten a quantity of bits M-N to obtain a codeword of the specified block length N for transmission.

In some cases, the wireless devices of the wireless communications system, 200 may support application of systematic polar codes to non-uniform sources. For example, a first wireless device (e.g., an encoder at the first wireless device), such as a first UE 115 or a first network entity 105, may apply a systematic polar code to a non-uniform source to generate a systematic polar codeword including multiple parity bits and multiple systematic bits. In some cases, the first wireless device may transmit the systematic polar codeword including both the parity bits and the systematic bits, such that a second wireless device (e.g., a decoder at the second wireless device), such as a second UE 115 or a second network entity 105, may decode the systematic polar codeword using a first LLR associated with the parity bits and a second LLR associated with the systematic bits.

In some other cases, the first wireless device may puncture at least a subset of the systematic bits and may transmit the systematic polar codeword including the parity bits and the remaining (e.g., non-punctured) systematic bits. In such cases, the second wireless device may decode the systematic polar codeword using a first LLR associated with the parity bits and a second LLR associated with the punctured systematic bits. For example, the first wireless device may puncture a first subset of the systematic bits, such that the transmitted systematic polar codeword includes the parity bits and a second subset of the systematic bits. In such cases, the second LLR used to decode the systematic polar codeword may be associated with the first subset of systematic bits. In some other examples, the first wireless device may puncture all of the systematic bits, such that the transmitted systematic polar codeword includes (e.g., only) the parity bits. In such cases, the second LLR used to decode the systematic polar codeword may be associated with the systematic bits.

Figure 2:
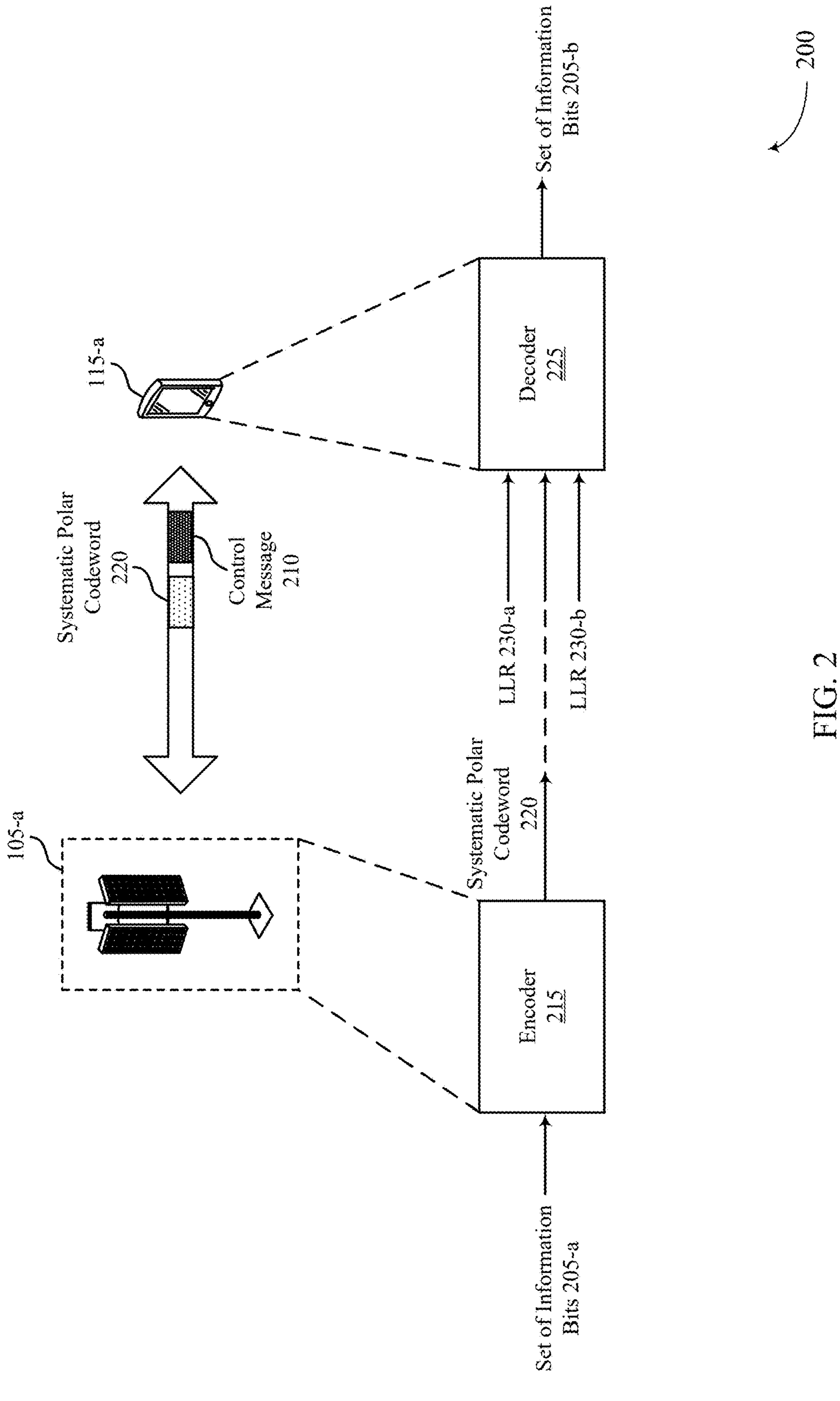
FIG. 2 shows an example of a wireless communications system that supports techniques for applying systematic polar codes for JSCC in accordance with one or more aspects of the present disclosure.

FIG. 2 shows an example of a wireless communications system 200 that supports techniques for applying systematic polar codes for JSCC in accordance with one or more aspects of the present disclosure. In some cases, the wireless communications system 200 may implement or be implemented by aspects of the wireless communications system 100. For example, the wireless communications system 200 may include one or more UEs 115 (e.g., a UE 115-*a*) and one or more network entities 105 (e.g., a network entity 105-*a*), which may be examples of the corresponding devices as described herein.

In some wireless communications systems, such as the wireless communications system 200, residual redundancy may be introduced to an information payload (e.g., at a physical layer of the UE 115-*a*) due to source coding of a set of information bits 205 of the information payload (e.g., at an application layer of the UE 115-*a*). That is, an encoder (e.g., source coder) may make assumptions about the set of information bits 205, which may be referred to as a source, and, in some cases, the assumptions may be incorrect, such that residual redundancy is introduced to the source at an output of the encoder.

In some cases, the residual redundancy may result in a non-uniform probability associated with the source (e.g., set of information bits 205), such that some information bits of the source may be more likely (e.g., associated with a higher probability) than other information bits of the source. In such cases, the source may be referred to as a non-uniform source and the non-uniform probability may be referred to a non-uniform distribution (e.g., non-uniform prior) of the source. In particular (e.g., for communication), the non-uniform distribution (e.g., conditional distribution) of the source may be based on side information at a receiver (e.g., rather than a raw distribution of the source, which may still be uniform). In other words (e.g., in many applications), a receiver (e.g., receiver side) may have side information about the source that may be exploited at the receiver to facilitate decoding.

For example, for hybrid automatic repeat requests (HARQ) feedback (e.g., HAQ-acknowledgment (ACK)), a first wireless device may transmit, to a second wireless device, an ACK or a negative ACK (NACK), where an ACK (e.g., bit-0) is more likely (e.g., associated with a higher probability) than a NACK (e.g., bit-1). Thus, as an illustrative example, if the network entity 105-*a* schedules 5 physical downlink shared channel (PDSCH) transmissions, the UE 115-*a* may transmit a 5-bit message for HARQ feedback (e.g., HARQ ACK/NACK) based on decoding of the 5 PDSCH transmissions. As such, a 10% block error rate (BLER) in PDSCH may result in a 10% probability of NACK and a 90% probability of ACK. Similar to HARQ feedback, a distribution of channel state feedback (CSF) may be non-uniform and may be correlated over time. Additionally, or alternatively, data communications (e.g., semantic data communications) for transmission of speech, images, video, extended reality (XR), or the like thereof, may be associated with residual redundancy.

To encode a non-uniform source, a first wireless device (e.g., transmitter) may apply (e.g., directly) a polar code to the non-uniform source, such that a second wireless device (e.g., receiver) may decode the polar encoded non-uniform source based on a non-uniform distribution associated with the source (e.g., exploit a non-uniform prior of the source in a decoder of the second wireless device). However, for some decoders, such as SCL decoders (e.g., at the second wireless devices), processing non-uniform sources may result in increased complexity and decreased efficiency (e.g., the decoders may have limited capabilities to support non-uniform sources). For example, information (e.g., which is also known as prior information in channel coding literature) associated with non-uniform distributions may be global information. However, some decoders, such as SCL decoders, may use the information associated with the non-uniform distributions in a localized manner rather than a global manner, thus decreasing decoder performance.

In some cases, a successive cancellation (SCAN) decoder or a belief propagation (BP) decoder may be used to increase decoder performance for non-uniform sources. However, implementing multiple (e.g., two different) decoding algorithms (e.g., for polar codes) in a receiving wireless device, such as the second wireless device, may increase complexity. Alternatively, a double-polar approach may be applied to non-uniform sources in which two polar codes are used at a transmitting wireless device, such as the first wireless device, where a first polar code may compress the non-uniform source into uniform bits (e.g., source code) and a second polar code may be used as a channel encoder (e.g., conventional channel encoder). In other words, the double-polar approach may be based on separately performing source coding and channel coding. However, performing double-polar based separate source and channel coding (SSCC) may result in increased complexity (e.g., particularly with uplink control information (UCI) and downlink control information (DCI)) due to both the first wireless device (e.g., transmitter) and the second wireless device (e.g., receiver) implementing both a source encoding or decoder, respectively, and a channel encoder or decoder, respectively.

Accordingly, techniques described herein may support application of systematic polar codes (e.g., for JSCC) for communication of non-uniform sources (e.g., non-uniformly distributed sources). For example, a first wireless device, such as the network entity 105-*a*, and a second wireless device, such as the UE 115-*a*, may communicate a control message 210 indicating a systematic polar code configuration. In some cases (e.g., as depicted), the network entity 105-*a* may transmit the control message 210 indicating the systematic polar code configuration, such that the systematic polar code configuration indicates that the network entity 105-*a* is going to perform systematic polar encoding on a source associated with a non-uniform distribution, which may be referred to as the non-uniform source. Additionally, or alternatively, the UE 115-*a* may transmit the control message 210 indicating the systematic polar code configuration, such that the systematic polar code configuration requests that the network entity 105-*a* perform systematic polar encoding on the non-uniform source. In either case, the non-uniform source may include a set of information bits 205-*a* represented by '$a_0, \ldots, a_{K-1}$' where 'K' represents a length of the non-uniform source (e.g., quantity of the set of information bits 205-*a*). Additionally, in some cases, the control message 210 (e.g., or another control message 210) may indicate the non-uniform distribution (e.g., non-uniform probability) of the non-uniform source.

Thus, an encoder 215 (e.g., systematic polar encoder 215) at the network entity 105-*a* may apply a systematic polar code to the non-uniform source to generate a systematic polar codeword 220, where the systematic polar codeword 220 includes the set of information bits 205-*a* represented by '$a_0, \ldots, a_{K-1}$,' which may be referred to as a set of systematic bits, and a set of parity bits, which may be represented by '$p_0, \ldots, p_{N-K-1}$,' where 'N' may represent a block length of the systematic polar code, such that the systematic polar codeword 220 may be represented by '$a_0, \ldots, a_{K-1}, p_0, \ldots, p_{N-K-1}$.' In other words, the encoder 215 may map the non-uniform source bits to information bit locations of the systematic polar codeword 220.

That is, applying a systematic polar code may be a two-step procedure. In a first step, the encoder 215 may generate an input sequence vector 'u,' where the bits $u_i$ of the input sequence vector include the set of information bits 205-*a*, '$a_0, \ldots, a_{K-1}$,' of the non-uniform source and frozen bits set to zero, and may encode the input sequence vector using a polar code, '$G_m$,' to generate (e.g., obtain) an intermediate codeword, 'x,' according to Equation 2:

$$x = uG_m \tag{1}$$

where $$G_m = \begin{pmatrix} 1 & 0 \\ 1 & 1 \end{pmatrix}^{\otimes m}$$

and m is an integer value. The encoder 215 may then involve the obtained codeword, 'x,' set $x_i=0$ if $u_i$ is a frozen symbol, and re-encode the adjusted (e.g., modified) codeword, 'x',' using $G_m$, where, again, $$G_m = \begin{pmatrix} 1 & 0 \\ 1 & 1 \end{pmatrix}^{\otimes m}.$$

The resulting codeword, 'c,' may be the systematic polar codeword 220 defined by $c=x'G_m$, where the set of information bits 205, '$a_0, \ldots, a_{K-1}$,' of the non-uniform source may appear as part of the encoded systematic polar codeword 220. In other words, as described previously, the systematic polar codeword 220 may include the set of systematic bits (e.g., set of information bits 205), '$a_0, \ldots, a_{K-1}$,' and the set of parity bits, '$p_0, \ldots, p_{N-K-1}$,' such that the systematic polar codeword 220 may be represented by '$a_0, \ldots, a_{K-1}, p_0, \ldots, p_{N-K-1}$.' For uniform sources, a systematic polar codeword 220 may have a same BLER as a non-systematic polar codeword under SC decoding.

Thus, the network entity 105-*a* may transmit the systematic polar codeword 220, including the systematic bits and the set of parity bits, to the UE 115-*a*. The UE 115-*a* may receive the systematic polar codeword 220 and decode the systematic polar codeword 220 using a decoder 225 at the UE 115-*a*. That is, the decoder 225 may first decode the systematic polar codeword 220, 'c,' defined by $c=x'G_m$ using an SCL decoder (e.g., standard SCL decoder) to obtain intermediate codeword, 'x,' and then obtain a set of estimated information bits 205-*b*, '$\hat{a}_0, \ldots, \hat{a}_{K-1}$,' by re-encoding the intermediate bits using $G_m$ and the selecting the set of estimated information bits 205-*b*, '$\hat{a}_0, \ldots, \hat{a}_{K-1}$,' from information bit locations. In other words, the set of estimated information bits 205-*b* generated by the UE 115-*a* may correspond to (e.g., may be the, same as when decoding is accurate) the set of information bits 205-*a*, '$a_0, \ldots, a_{K-1}$,' encoded by the encoder 215.

In such cases, to decode the systematic polar codeword 220, the decoder 225 may consider both an LLR 230-*a* associated with the set of systematic bits (e.g., the set on information bits 205-*a* and an LLR 230-*b* associated with the set of parity bits. The LLR 230-*b* for the set of parity bits may be a channel LLR. Additionally, the decoder 225 may obtain the LLR 230-*a* based on adding a logarithmic function of a probability associated with non-uniform distribution of the non-uniform source to the channel LLR. That is, the decoder 225 may obtain the LLR 230-*a* by adding $$\log \frac{P(a_i = 0)}{P(a_i = 1)}$$

to the channel LLR, where $P(a_i=0)$ represents a probability (e.g., likelihood) that an information bit $a_i$ of the set of information bits 205-*a*, '$a_0, \ldots, a_{K-1}$,' is zero and $P(a_i=1)$ represents a probability that the information bit $a_i$ is 1. In such cases, $P(a_i=0)\neq 0.5$ for the set of information bits 205-*a*, '$a_0, \ldots, a_{K-1}$.'' In some cases, information related to the probabilities (e.g., $P(a_i=0)$ and $P(a_i=1)$) may be referred to as prior information of the source $a_i$. That is, the information related to the probabilities may be a quantity of information known by the decoder 225 about $a_i$ prior to the decoding. Conversely, information known by the decoder 225 about $a_i$ after the decoding may be referred to as posterior information. In some cases, the decoder 225 may be a max aposterior (MAP) decoder 225.

Though described in the context of the UE 115-*a* and the network entity 105-*a*, this is not to be regarded as a limitation of the present disclosure. In this regard, the depiction of the encoder 215 at the network entity 105-*a* and the decoder 225 at the UE 115-*a* is merely an illustrative example of an encoder 215 at a first wireless device and a decoder 225 at a second wireless device, respectively, such that any wireless devices may be considered with reference to the techniques described herein. In other words, the techniques described herein may be employed for uplink, downlink, sidelink, or the like thereof. For example, in some cases (e.g., not depicted), the UE 115-*a* may include the encoder 215 and the network entity 105-*a* may include the decoder 225, such that the UE 115-*a* may transmit uplink control information (UCI) to the network entity 105-*a* (e.g., via a PUCCH channel).

Figure 3:
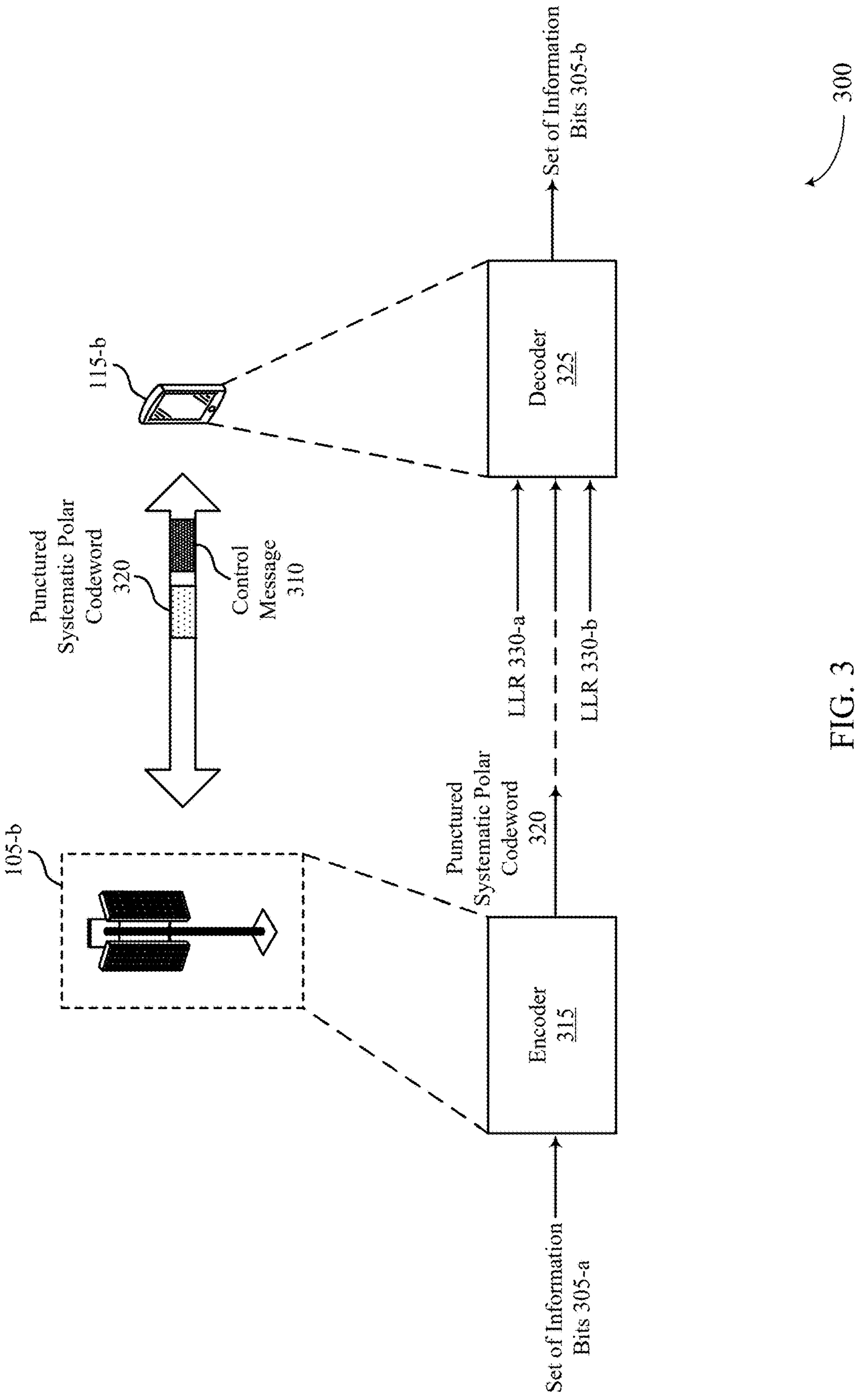
FIG. 3 shows an example of a wireless communications system that supports techniques for applying systematic polar codes for JSCC in accordance with one or more aspects of the present disclosure.

FIG. 3 shows an example of a wireless communications system 300 that supports techniques for applying systematic polar codes for JSCC in accordance with one or more aspects of the present disclosure. In some cases, the wireless communications system 300 may implement or be implemented by aspects of the wireless communications system 100, the wireless communications system 200, or both. For example, the wireless communications system 300 may include one or more UEs 115 (e.g., a UE 115-*b*) and one or more network entities 105 (e.g., a network entity 105-*b*), which may be examples of the corresponding devices as described herein.

In some cases, wireless devices of the wireless communications system 300 may support application of systematic polar codes (e.g., for JSCC) for communication of non-uniform sources (e.g., non-uniformly distributed sources). For example, as described with reference to FIG. 2, a first wireless device, such as the network entity 105-*b* (e.g., the network entity 105-*a*), and a second wireless device, such as the UE 115-*b* (e.g., the UE 115-*a*), may communicate a control message 310 indicating a systematic polar code configuration. In some cases (e.g., as depicted), the network entity 105-*b* may transmit the control message 310 indicating the systematic polar code configuration, such that the systematic polar code configuration indicates that the network entity 105-*b* is going to perform systematic polar encoding on a source associated with a non-uniform distribution, which may be referred to as the non-uniform source. Additionally, or alternatively, the UE 115-*b* may transmit the control message 310 indicating the systematic polar code configuration, such that the systematic polar code configuration requests that the network entity 105-*b* perform systematic polar encoding on the non-uniform source. In either case, the non-uniform source may include a set of information bits 305-*a* represented by '$a_0, \ldots, a_{K-1}$' where 'K' represents a length of the non-uniform source (e.g., quantity of the set of information bits 305-*a*). Additionally, in some cases, the control message 310 (e.g., or another control message 310) may indicate the non-uniform distribution (e.g., non-uniform probability) of the non-uniform source.

Additionally, or alternatively, the systematic polar code configuration may indicate for the network entity 105-*a* to puncture at least a first subset of a set of systematic bits of a systematic polar codeword. That is, an encoder 315 (e.g., systematic polar encoder 315) at the network entity 105-*b* may apply a systematic polar code to the non-uniform source to generate a systematic polar codeword, where the systematic polar codeword includes the set of information bits 305-*a* represented by '$a_0, \ldots, a_{K-1}$,' which may be referred to as a set of systematic bits, and the set of parity bits, which may be represented by '$p_0, \ldots, p_{N-K-1}$,' where 'N' may represent a block length of the systematic polar code, such that the systematic polar codeword may be represented by '$a_0, \ldots, a_{K-1}, p_0, \ldots, p_{N-K-1}$.' In other words, the encoder 315 may map the non-uniform source to information bit locations of the systematic polar codeword, as described with reference to FIG. 2.

However, the set of systematic bits may be associated with a non-uniform distribution (e.g., due to the source distribution), which may lead to capacity loss in some channels (e.g., symmetric channels, such as binary phase shift key (BPSK) or quadrature phase shifting key (QPSK) modulated additive white Gaussian noise (AWGN) channels) due to a capacity achieving input for the channels (e.g., binary-input symmetric channels) being associated with a uniform distribution. Thus, as described previously, the systematic polar code configuration may indicate for the network entity 105-*b* to puncture at least the first subset of the set of systematic bits of the systematic polar codeword. In other words, the network entity 105-*b* may not transmit the systematic polar codeword including the set of parity bits and the set of systematic bits (e.g., all of the set of systematic bits). Rather, the network entity 105-*a* may puncture at least a first subset of the set of systematic bits, such that the network entity 105-*b* may transmit, to the UE 115-*b*, a punctured systematic polar codeword 320, where the punctured systematic polar codeword 320 includes the set of parity bits and either a second subset of the set of systematic bits or no systematic bits.

For example, in some cases, the systematic polar code configuration may indicate for the network entity 105-*b* to puncture all of the set of systematic bits. In other words, the network entity 105-*b* may puncture the set of systematic bits, "$a_0, \ldots, a_{K-1}$," from the systematic polar codeword, '$a_0, \ldots, a_{K-1}, p_0, \ldots, p_{N-K-1}$,' such that the punctured systematic polar codeword 320 includes (e.g., just includes) the set of parity bits represented by '$p_0, \ldots, p_{N-K-1}$.' Thus, the network entity 105-*b* may transmit the punctured systematic polar codeword 320 including the set of parity bits and may not transmit non-uniform bits (e.g., the set of systematic bits), which may result in no loss of capacity due to transmission of the non-uniform bits.

For example, as an illustrative example, 'K' may equal 64 bits, 'N' may equal 128 bits, and decoding may be based on SCL 8. Thus, for the punctured systematic polar codeword 320, a polarization matrix size may be 256 bits and the network entity 105-*b* may puncture a first 64 bits (e.g., as rate matching) and all 64 systematic bits. In such cases, a new radio (NR) sequence may be used for both systematic polar codewords and non-systematic polar codewords. However, a 1.6 dB gain may be associated with use of systematic polar codewords compared to the use of non-systematic polar codewords with puncturing of systematic bits (e.g., incorporating non-uniform distributions when decoding $u_i$).

In some other cases, the systematic polar code configuration may indicate for the network entity 105-*b* to puncture a first subset of the set of systematic bits. That is, polar codes may be used for both uplink control channels and downlink control channels and, for each control channel, different types of control information (e.g., UCI and DCI) may be communicated. For example, for uplink control channels, the different types of control information may include HARQ feedback (e.g., ACK, NACK), channel state information (CSI), scheduling requests (SRs), or any combination thereof. For downlink control channels, the different types of control information may include DCI for uplink or downlink scheduling (e.g., grants), group-common DCI (e.g., conveying power control), wake up signals, slot format indicators (SFIs), or any combination thereof. However, for both uplink and downlink, part (e.g., only part) of the control information may be associated with a non-uniform distribution. Thus, for a systematic polar codeword including control information, the systematic polar code configuration may indicate for the network entity 105-*b* to puncture the first subset of the set of systematic bits that correspond to a first part of the control information that has a non-uniform distribution, such that the network entity 105-*b* may not puncture a second subset of the set of systematic bits that correspond to a second part of the control information that has a uniform distribution. In other words, the systematic polar code configuration may indicate for the network entity 105-*b* to puncture the first subset of the set of systematic bits that are associated with a threshold level of non-uniform distribution (e.g., biased distribution).

For example, for DCI carrying uplink or downlink grants, some control fields of the DCI may be associated with large redundancy (e.g., in terms of entropy) and some other control fields may be associated with less redundancy (e.g., more uniform distribution). The control fields associated with large redundancy may include, but may not be limited to, a modulation and coding scheme (MCS) field, a time domain resource allocation (TDRA) field, a frequency domain resource allocation (FDRA) field, a rank field, a precoding matrix indicator (PMI) field, or any combination thereof. Conversely, the other control fields associated with more uniform distribution may include, but may not be limited to, a HARQ process number field, a transmit power control (TPC) field (e.g., for uplink), a DCI format indicator field, a CSI/RS trigger field, a demodulation reference signal (DMRS) port field, a downlink assignment index (DAI) field, or any combination thereof. In another example, for uplink, HARQ feedback and CSI may be associated with a non-uniform distribution (e.g., large bias), while SR may be associated with more uniform distribution. Thus, the network entity 105-*a* may configure which fields in the DCI or which type of UCI may be punctured (e.g., based on estimates of the probability distribution of these control information) via the systematic polar code configuration.

In either case, the UE 115-*b* may receive the punctured systematic polar codeword 320 and decode the punctured systematic polar codeword 320, as described with reference to FIG. 2. That is, a decoder 325 at the UE 115-*b* may first decode $G_m$ using an SCL decoder (e.g., standard SCL decoder) to obtain intermediate bits, 'u,' and then obtain a set of information bits 305-*b*, '$\hat{a}_0, \ldots, \hat{a}_{K-1}$,' by re-encoding the intermediate bits using $G_m$ and the selecting the set of information bits 305-*b*, '$\hat{a}_0, \ldots, \hat{a}_{K-1}$,' from information bit locations. In other words, the set of information bits 305-*b* received by the UE 115-*b* may correspond to the set of information bits 305-*a*, '$a_0, \ldots, a_{K-1}$,' encoded by the encoder 315.

In such cases, to decode the punctured systematic polar codeword 320, the decoder 325 may consider both an LLR 330-*a* associated with the set of punctured systematic bits (e.g., the first subset of the set of systematic bits, all of the set of systematic bits) and an LLR 330-*b* associated with the set of parity bits. The LLR 330-*b* for the set of parity bits may be a channel LLR. Additionally, the UE 115-*b* may obtain the LLR 330-*a* based on a logarithmic function of a probability associated with non-uniform distribution of the source. That is, the LLR 330-*a* of the set of punctured systematic bits may be initialized at a receiver of the UE 115-*b* with $$\log \frac{P(a_i = 0)}{P(a_i = 1)},$$

where $P(a_i=0)$ represents a probability (e.g., likelihood) that an information bit $a_i$ of the set of information bits 205-*a*, '$a_0, \ldots, a_{K-1}$,' is zero and $P(a_i=1)$ represents a probability that the information bit $a_i$ is 1, such that the decoder 325 may use the non-uniform distribution of the set of punctured system bits to decode the set of information bits. In such cases, the decoder 225 may obtain the LLR 230-*a* by adding $$\log \frac{P(a_i = 0)}{P(a_i = 1)}$$

to the channel LLR. In some cases, $P(a_i=0) \neq 0.5$ for the set of information bits 205-*a*, '$a_0, \ldots, a_{K-1}$.'"

Though described in the context of the UE 115-*b* and the network entity 105-*b*, this is not to be regarded as a limitation of the present disclosure. In this regard, the depiction of the encoder 315 at the network entity 105-*b* and the decoder 325 at the UE 115-*b* is merely an illustrative example of an encoder 315 at a first wireless device and a decoder 325 at a second wireless device, respectively, such that any wireless devices may be considered with reference to the techniques described herein. In other words, the techniques described herein may be employed for uplink, downlink, sidelink, or the like thereof. For example, in some cases (e.g., not depicted), the UE 115-*b* may include the encoder 315 and the network entity 105-*b* may include the decoder 325.

Figure 4:
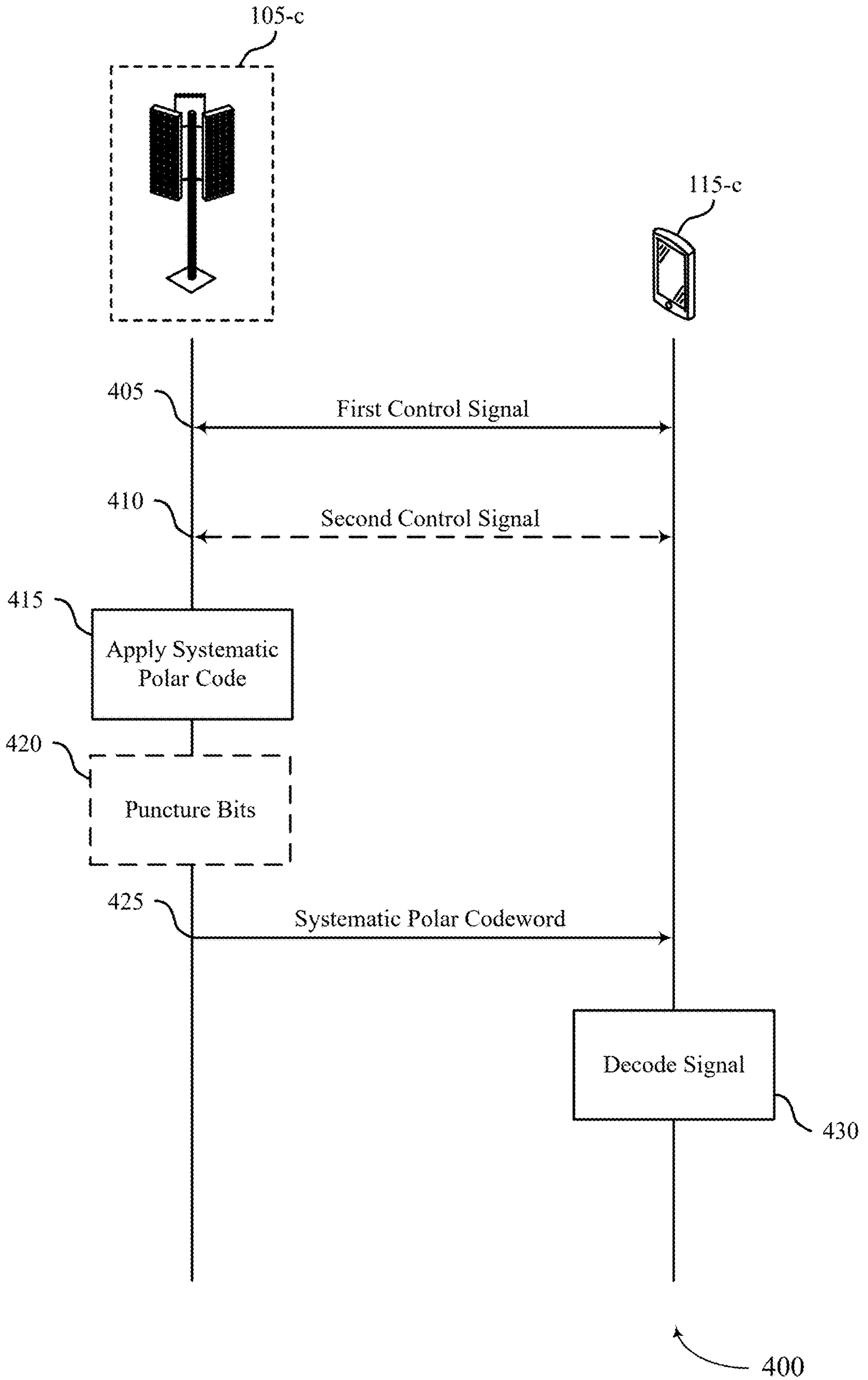
FIG. 4 shows an example of a process flow that supports techniques for applying systematic polar codes for JSCC in accordance with one or more aspects of the present disclosure.

FIG. 4 shows an example of a process flow 400 that supports techniques for applying systematic polar codes for JSCC in accordance with one or more aspects of the present disclosure. In some cases, the process flow 400 may implement or be implemented by aspects of the wireless communications system 100, the wireless communications system 200, the wireless communications system 300, or any combination thereof. For example, the process flow 400 may include one or more UEs 115 (e.g., a UE 11-*c*) and one or more network entities 105 (e.g., a network entity 105-*c*), which may be examples of the corresponding devices as described herein. In the following description of the process flow 400, the operations between the UE 115-*c* and the network entity 105-*c* may be transmitted in a different order than the example order shown, or the operations performed by the UE 115-*c* and the network entity 105-*c* may be performed in different orders or at different times. Some operations may also be omitted from the process flow 400, and other operations may be added to the process flow 400.

At 405, the network entity 105-*c* and the UE 115-*c* may communicate (e.g., transmit, receive) a first control signal (e.g., message) indicating a systematic polar code configuration, where the systematic polar code configuration indicates for the network entity 105-*c* to perform systematic polar encoding on a first set of bits associated with a non-uniform bit distribution. Additionally, or alternatively, the systematic polar code configuration may further indicate for the network entity 105-*c* to puncture at least a first subset of a set of systematic bits (e.g., either the first subset of the set of systematic bits or all of the set of systematic bits). In some cases, the systematic polar code configuration may indicate for the network entity 105-*c* to puncture the first subset of the plurality of systematic bits associated with a first level of non-uniform bit distribution satisfying a threshold level of non-uniform bit distribution. Additionally, or alternatively, the systematic polar code configuration may indicate one or more fields of control information, a type of control information, or both, to puncture, where the first subset of the set of systematic bits are associated with the one or more fields, the type of control information, or both. For example, the one or more fields may include an MCS field, a TDRA field, an FDRA field, a rank field, a PMI field, or any combination thereof.

In some cases, at 410, the network entity 105-*c* and the UE 115-*c* may communicate a second control signal indicating the non-uniform bit distribution associated with the first set of bits. In some examples, the non-uniform distribution may be based on a residual redundancy after source encoding at an application layer of the network entity 105-*c*.

At 415, the network entity 105-*c* may apply a systematic polar code to the first set of bits to generate a systematic polar codeword based on the systematic polar code configuration. In such cases the systematic polar codeword may include a set of parity bits (e.g., corresponding to the first set of bits) and a set of systematic bits.

In some cases, at 420, the network entity 105-*c* may puncture at least the first subset of the set of systematic bits based on the systematic polar code configuration. For example, in some cases, the network entity 105-*c* may puncture the first subset of the set of systematic bits based on the systematic polar code configuration indicating for the network entity 105-*c* to puncture the first subset of a set of systematic bits. In some cases, the first subset of the set of systematic bits may be punctured based on the first subset of the set of systematic bits being associated with the first level of non-uniform bit distribution satisfying (e.g., exceeding) the threshold level of non-uniform bit distribution. Additionally, or alternatively, the first subset of the set of systematic bits may be associated with control information.

In some other cases, the network entity 105-*c* may puncture all of the set of systematic bits based on the systematic polar code configuration indicating for the network entity 105-*c* to puncture all of the set of systematic bits. In some cases, one or more cyclic redundancy check (CRC) bits associated with the set of parity bits may not be punctured from the systematic polar codeword based on the systematic polar code configuration.

At 425, the network entity 105-*c* may transmit, to the UE 115-*c*, the systematic polar codeword including at least the set of parity bits. For example, in some cases, the network entity 105-*c* may transmit the systematic polar codeword including the set of parity bits and the set of systematic bits. In some other cases, the network entity 105-*c* may transmit the systematic polar codeword including the set of parity bits and the second subset of the set of systematic bits (e.g., a set of non-punctured systematic bits) based on the first subset of the set of systematic bits being punctured from the systematic polar codeword. In such cases, the second subset of the set of systematic bits may be associated with a second level of non-uniform distribution that does not satisfy (e.g., is less than) the threshold level of non-uniform distribution. In some other cases, the network entity 105-*c* may transmit the systematic polar codeword including just the set of parity bits (e.g., with none of the set of systematic bits) based on the set of systematic bits being punctured from the systematic polar codeword.

At 430, the UE 115-*c* may decode at least the set of parity bits of the systematic polar codeword. In some cases, decoding the systematic polar codeword may be based on a first LLR associated with the set of parity bits and a second LLR associated with at least the first subset of the set of systematic bits, where the first LLR is based on a channel LLR of a channel used to receive the systematic polar codeword.

In some cases (e.g., the systematic polar codeword includes the set of parity bits and the set of systematic bits), the second LLR may be associated with all of the set of systematic bits. In some other cases (e.g., the systematic polar codeword includes the set of parity bits and either the first subset set of systematic bits or none of the set of systematic bits), the second LLR may be associated with the set of punctured systematic bits (e.g., the first subset of the set of systematic bits or all of the set of systematic bits). In either case, the second LLR may be based on a ratio of a first probability of a first potential value of each of the set of systematic bits relative to a second probability of a second potential value of each of the set of systematic bits.

Though described in the context of the UE 115-*c* and the network entity 105-*c*, this is not to be regarded as a limitation of the present disclosure. In this regard, the depiction of the network entity 105-*c* and the UE 115-*c* is merely an illustrative example of a first wireless device and a second wireless device, such that any wireless devices may be considered with reference to the techniques described herein. In other words, the techniques described herein may be employed for uplink, downlink, sidelink, or the like thereof.

Figure 5:
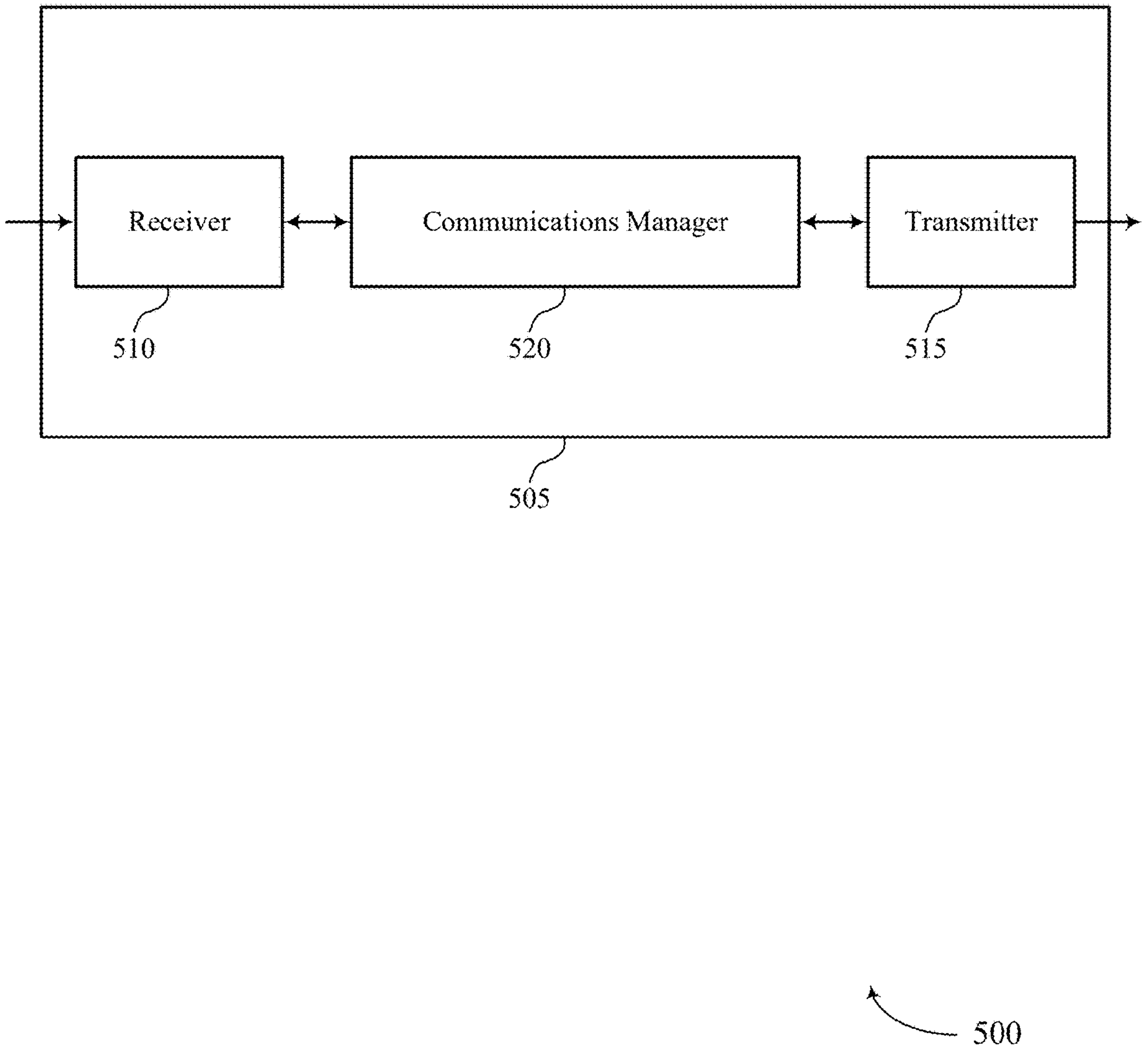
FIGS. 5 and 6 show block diagrams of devices that support techniques for applying systematic polar codes for JSCC in accordance with one or more aspects of the present disclosure.

FIG. 5 shows a block diagram 500 of a device 505 that supports techniques for applying systematic polar codes for JSCC in accordance with one or more aspects of the present disclosure. The device 505 may be an example of aspects of a UE 115 or a network entity 105 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for applying systematic polar codes for JSCC). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for applying systematic polar codes for JSCC). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations or components thereof may be examples of means for performing various aspects of techniques for applying systematic polar codes for JSCC as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor (e.g., referred to as a processor-executable code). If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for communicating, with a second wireless device, a control signal indicating a systematic polar code configuration, the systematic polar code configuration indicating for the first wireless device to perform systematic polar encoding on a first set of multiple bits associated with a non-uniform bit distribution. The communications manager 520 is capable of, configured to, or operable to support a means for applying a systematic polar code to the first set of multiple bits to generate a systematic polar codeword based on the systematic polar code configuration, the systematic polar codeword including a set of multiple parity bits and a set of multiple systematic bits. The communications manager 520 is capable of, configured to, or operable to support a means for transmitting at least the set of multiple parity bits of the systematic polar codeword.

Additionally, or alternatively, the communications manager 520 may support wireless communications in accordance with examples as disclosed herein. For example, the communications manager 520 is capable of, configured to, or operable to support a means for communicating, with a first wireless device, a control signal indicating a systematic polar code configuration, the systematic polar code configuration indicating for the first wireless device to perform systematic polar encoding on a first set of multiple bits associated with a non-uniform bit distribution. The communications manager 520 is capable of, configured to, or operable to support a means for receiving at least a set of multiple parity bits of a systematic polar codeword, where the set of multiple parity bits are based on the first set of multiple bits associated with the non-uniform bit distribution. The communications manager 520 is capable of, configured to, or operable to support a means for decoding the set of multiple parity bits to identify the first set of multiple bits of the systematic polar codeword.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for applying systematic polar codewords for source coding, which may result in reduced processing, reduced power consumption, and more efficient utilization of communication resources, among other advantages.

Figure 6:
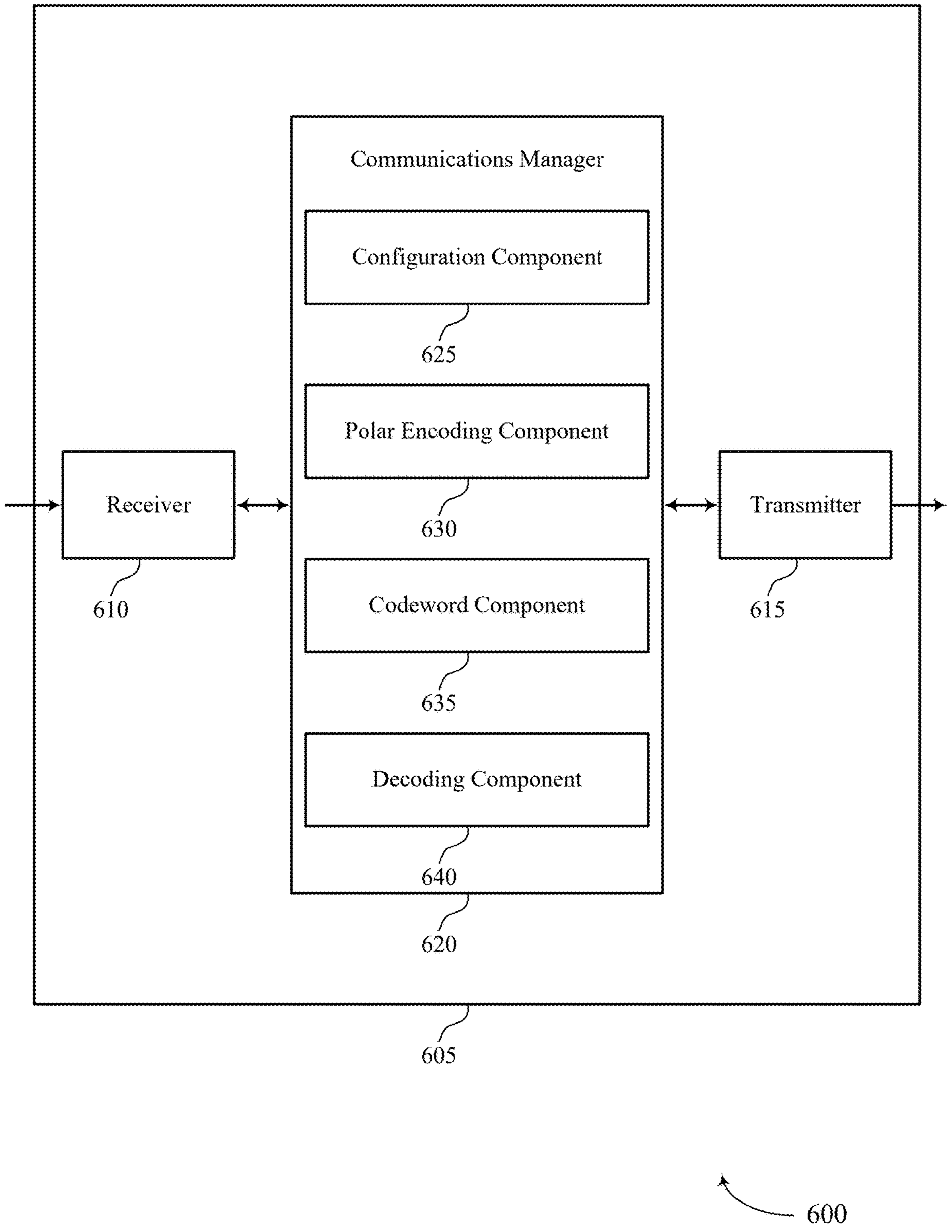

FIG. 6 shows a block diagram 600 of a device 605 that supports techniques for applying systematic polar codes for JSCC in accordance with one or more aspects of the present disclosure. The device 605 may be an example of aspects of a device 505, a UE 115, or a network entity 105 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for applying systematic polar codes for JSCC). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for applying systematic polar codes for JSCC). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for applying systematic polar codes for JSCC as described herein. For example, the communications manager 620 may include a configuration component 625, a polar encoding component 630, a codeword component 635, a decoding component 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The configuration component 625 is capable of, configured to, or operable to support a means for communicating, with a second wireless device, a control signal indicating a systematic polar code configuration, the systematic polar code configuration indicating for the first wireless device to perform systematic polar encoding on a first set of multiple bits associated with a non-uniform bit distribution. The polar encoding component 630 is capable of, configured to, or operable to support a means for applying a systematic polar code to the first set of multiple bits to generate a systematic polar codeword based on the systematic polar code configuration, the systematic polar codeword including a set of multiple parity bits and a set of multiple systematic bits. The codeword component 635 is capable of, configured to, or operable to support a means for transmitting at least the set of multiple parity bits of the systematic polar codeword.

Additionally, or alternatively, the communications manager 620 may support wireless communications in accordance with examples as disclosed herein. The configuration component 625 is capable of, configured to, or operable to support a means for communicating, with a first wireless device, a control signal indicating a systematic polar code configuration, the systematic polar code configuration indicating for the first wireless device to perform systematic polar encoding on a first set of multiple bits associated with a non-uniform bit distribution. The codeword component 635 is capable of, configured to, or operable to support a means for receiving at least a set of multiple parity bits of a systematic polar codeword, where the set of multiple parity bits are based on the first set of multiple bits associated with the non-uniform bit distribution. The decoding component 640 is capable of, configured to, or operable to support a means for decoding the set of multiple parity bits to identify the first set of multiple bits of the systematic polar codeword.

Figure 7:
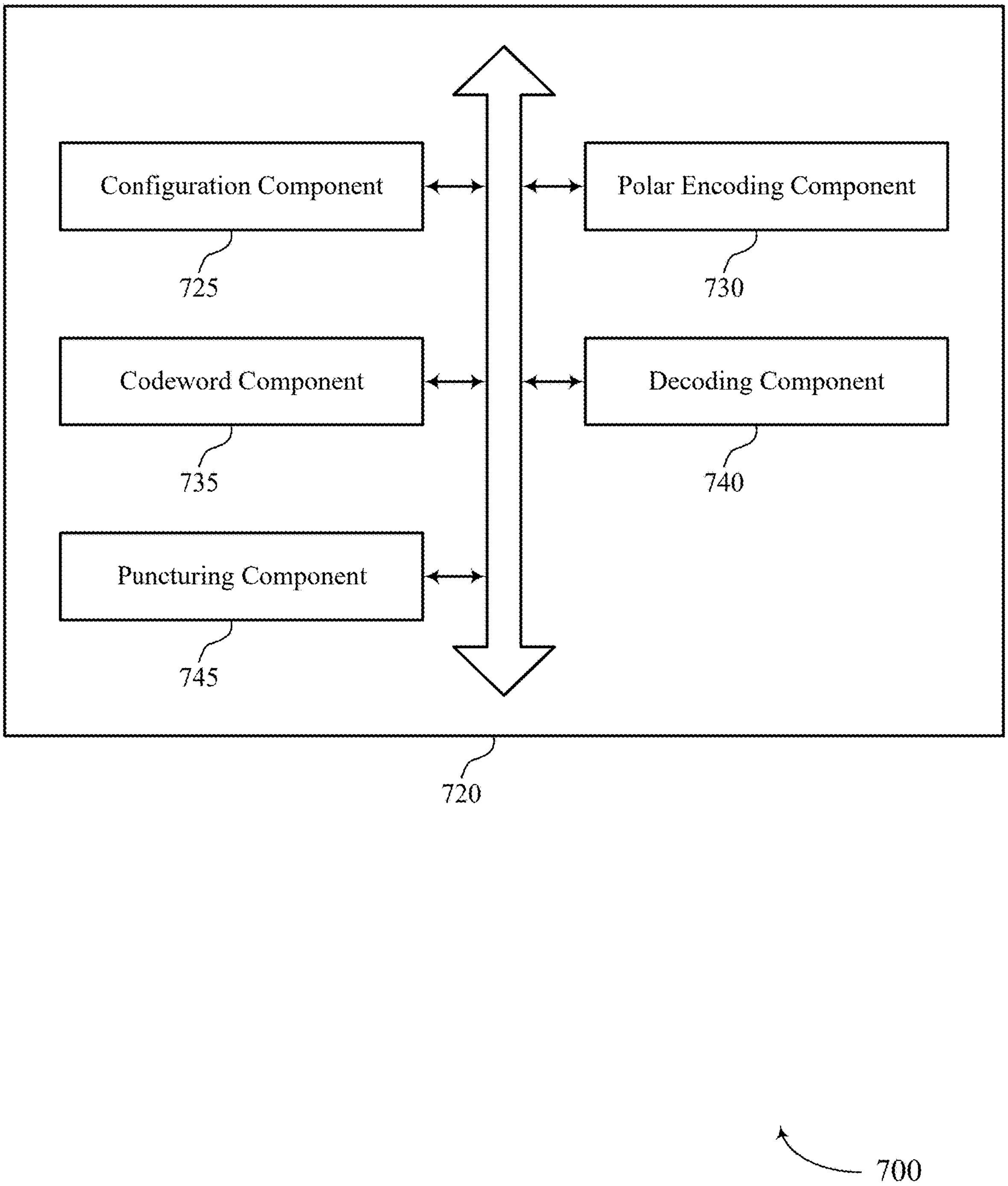
FIG. 7 shows a block diagram of a communications manager that supports techniques for applying systematic polar codes for JSCC in accordance with one or more aspects of the present disclosure.

FIG. 7 shows a block diagram 700 of a communications manager 720 that supports techniques for applying systematic polar codes for JSCC in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for applying systematic polar codes for JSCC as described herein. For example, the communications manager 720 may include a configuration component 725, a polar encoding component 730, a codeword component 735, a decoding component 740, a puncturing component 745, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 720 may support wireless communications in accordance with examples as disclosed herein. The configuration component 725 is capable of, configured to, or operable to support a means for communicating, with a second wireless device, a control signal indicating a systematic polar code configuration, the systematic polar code configuration indicating for the first wireless device to perform systematic polar encoding on a first set of multiple bits associated with a non-uniform bit distribution. The polar encoding component 730 is capable of, configured to, or operable to support a means for applying a systematic polar code to the first set of multiple bits to generate a systematic polar codeword based on the systematic polar code configuration, the systematic polar codeword including a set of multiple parity bits and a set of multiple systematic bits. The codeword component 735 is capable of, configured to, or operable to support a means for transmitting at least the set of multiple parity bits of the systematic polar codeword.

In some examples, to support transmitting at least the first set of multiple bits, the codeword component 735 is capable of, configured to, or operable to support a means for transmitting the systematic polar codeword including the set of multiple parity bits and the set of multiple systematic bits.

In some examples, the systematic polar code configuration further indicates for the first wireless device to puncture a first subset of the set of multiple systematic bits of the systematic polar codeword, and the puncturing component 745 is capable of, configured to, or operable to support a means for puncturing the first subset of the set of multiple systematic bits from the systematic polar codeword based on the systematic polar code configuration, where the set of multiple parity bits and a second subset of the set of multiple systematic bits of the systematic polar codeword are transmitted based on the first subset of the set of multiple systematic bits being punctured from the systematic polar codeword.

In some examples, the systematic polar code configuration indicates for the first wireless device to puncture all of the set of multiple systematic bits. In some examples, the set of multiple parity bits are transmitted based on the set of multiple systematic bits being punctured from the systematic polar codeword in accordance with the systematic polar code configuration.

In some examples, the systematic polar code configuration further indicates for the first wireless device to puncture the first subset of the set of multiple systematic bits associated with a first level of non-uniform bit distribution satisfying a threshold level of non-uniform bit distribution. In some examples, the set of multiple parity bits and a second subset of the set of multiple systematic bits are transmitted based on the first subset of the set of multiple systematic bits being punctured from the systematic polar codeword in accordance with the systematic polar code configuration. In some examples, the second subset of the set of multiple systematic bits are associated with a second level of non-uniform bit distribution that does not satisfy the threshold level of non-uniform bit distribution.

In some examples, the first subset of the set of multiple systematic bits are associated with control information.

In some examples, the systematic polar code configuration further indicates one or more fields of control information, a type of control information, or both, to puncture. In some examples, the first subset of the set of multiple systematic bits are associated with the one or more fields, the type of control information, or both.

In some examples, the one or more fields include an MCS field, a TDRA field, an FDRA field, a rank field, a PMI field, or any combination thereof.

In some examples, one or more CRC bits associated with the set of multiple parity bits are not punctured from the systematic polar codeword based on the systematic polar code configuration.

In some examples, the configuration component 725 is capable of, configured to, or operable to support a means for communicating a second control signal indicating the non-uniform bit distribution associated with the first set of multiple bits.

In some examples, the non-uniform bit distribution is based on residual redundancy after source coding at an application layer of the first wireless device.

Additionally, or alternatively, the communications manager 720 may support wireless communications in accordance with examples as disclosed herein. In some examples, the configuration component 725 is capable of, configured to, or operable to support a means for communicating, with a first wireless device, a control signal indicating a systematic polar code configuration, the systematic polar code configuration indicating for the first wireless device to perform systematic polar encoding on a first set of multiple bits associated with a non-uniform bit distribution. In some examples, the codeword component 735 is capable of, configured to, or operable to support a means for receiving at least a set of multiple parity bits of a systematic polar codeword, where the set of multiple parity bits are based on the first set of multiple bits associated with the non-uniform bit distribution. The decoding component 740 is capable of, configured to, or operable to support a means for decoding the set of multiple parity bits to identify the first set of multiple bits of the systematic polar codeword.

In some examples, decoding the systematic polar codeword is based on a first LLR associated with the set of multiple parity bits and a second LLR associated with at least a first subset of a set of multiple systematic bits, the at least first subset of the set of multiple systematic bits based on the systematic polar code configuration.

In some examples, the first LLR associated with the set of multiple parity bits is based on a channel LLR of a channel used to receive the systematic polar codeword.

In some examples, to support receiving at least the first set of multiple bits, the codeword component 735 is capable of, configured to, or operable to support a means for receiving the systematic polar codeword including the set of multiple parity bits and a set of multiple systematic bits.

In some examples, to support decoding the systematic polar codeword, the decoding component 740 is capable of, configured to, or operable to support a means for decoding the systematic polar codeword to identify the first set of multiple bits based on a first LLR associated with the set of multiple parity bits and a second LLR associated with the set of multiple systematic bits.

In some examples, the second LLR associated with the set of multiple systematic bits is based on a ratio of a first probability of a first potential value of each of the set of multiple systematic bits relative to a second probability of a second potential value of each of the set of multiple systematic bits.

In some examples, the systematic polar code configuration further indicates for the first wireless device to puncture a set of multiple systematic bits. In some examples, the set of multiple systematic bits are based on the systematic polar code configuration. In some examples, decoding the systematic polar codeword is based on a first LLR associated with the set of multiple parity bits and a second LLR associated with the set of multiple systematic bits.

In some examples, the second LLR associated with the set of multiple systematic bits is based on a ratio of a first probability of a first potential value of each of the set of multiple systematic bits relative to a second probability of a second potential value of each of the set of multiple systematic bits.

In some examples, to support receiving at least the first set of multiple bits, the codeword component 735 is capable of, configured to, or operable to support a means for receiving the systematic polar codeword including the set of multiple parity bits and a second subset of the set of multiple systematic bits, where the second subset of the set of multiple systematic bits are associated with a second level of non-uniform bit distribution that does not satisfy the threshold level of non-uniform bit distribution.

In some examples, decoding the systematic polar codeword is based on a first LLR associated with the set of multiple parity bits and a second LLR associated with the first subset of the set of multiple systematic bits.

In some examples, the second LLR associated with the first subset of the set of multiple systematic bits is based on a ratio of a first probability of a first potential value of each of the first subset of the set of multiple systematic bits relative to a second probability of a second potential value of each of the first subset of the set of multiple systematic bits.

In some examples, the first subset of the set of multiple systematic bits are associated with control information.

In some examples, the systematic polar code configuration further indicates one or more fields of control information, a type of control information, or both, to puncture. In some examples, the first subset of the set of multiple systematic bits are associated with the one or more fields, the type of control information, or both.

In some examples, the one or more fields include an MCS field, a TDRA field, an FDRA field, a rank field, a PMI field, or any combination thereof.

In some examples, the configuration component 725 is capable of, configured to, or operable to support a means for communicating a second control signal indicating the non-uniform bit distribution associated with the first set of multiple bits.

In some examples, the non-uniform bit distribution is based on residual redundancy after source coding at an application layer of the first wireless device.

Figure 8:
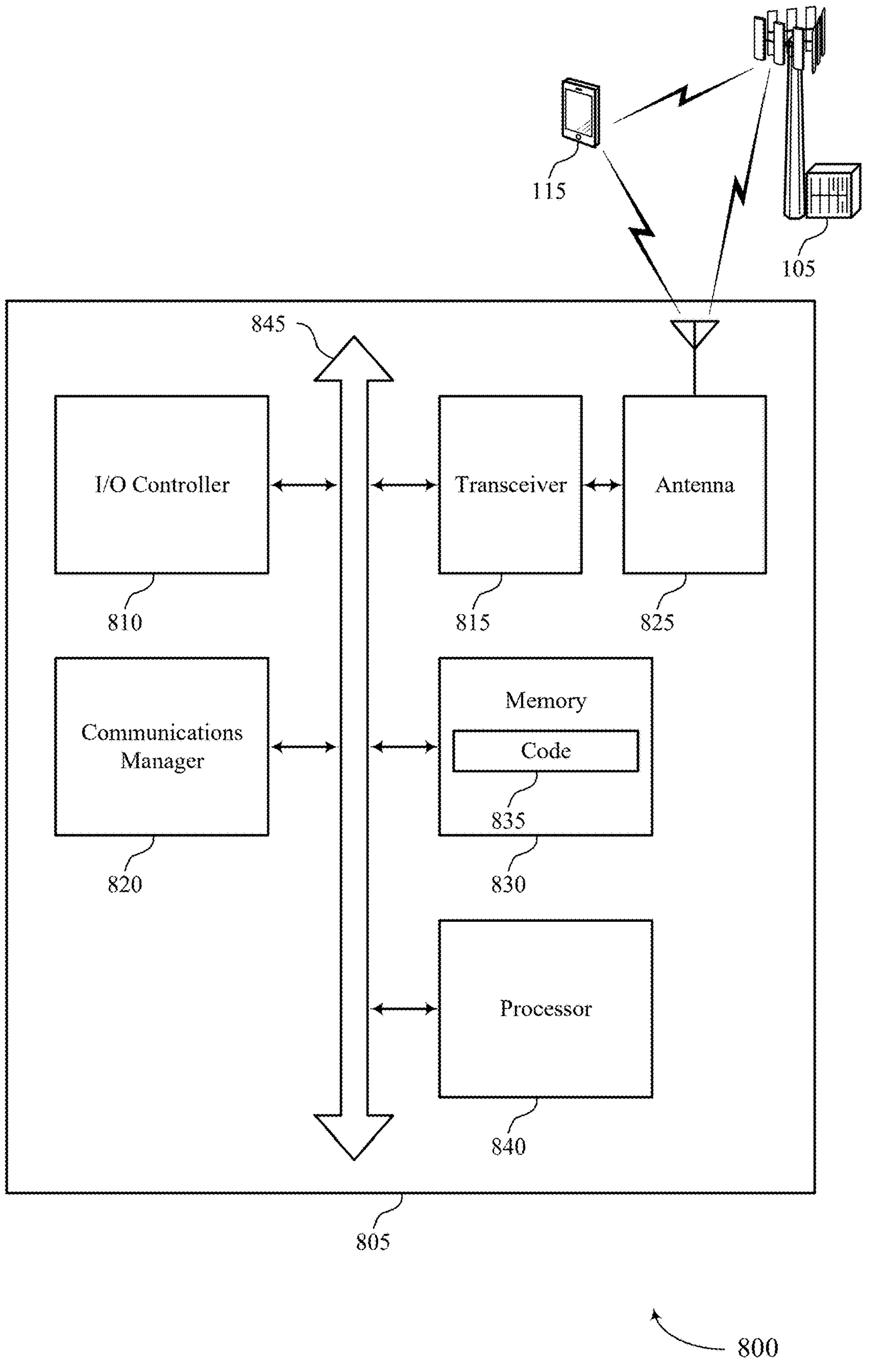
FIG. 8 shows a diagram of a system including a UE that supports techniques for applying systematic polar codes for JSCC in accordance with one or more aspects of the present disclosure.

FIG. 8 shows a diagram of a system 800 including a device 805 that supports techniques for applying systematic polar codes for JSCC in accordance with one or more aspects of the present disclosure. The device 805 may be an example of or include components of a device 505, a device 605, or a UE 115 as described herein. The device 805 may communicate (e.g., wirelessly) with one or more other devices (e.g., network entities 105, UEs 115, or a combination thereof). The device 805 may include components for bi-directional voice and data communications including components for transmitting and receiving communications, such as a communications manager 820, an input/output (I/O) controller, such as an I/O controller 810, a transceiver 815, one or more antennas 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna. However, in some other cases, the device 805 may have more than one antenna, which may be capable of concurrently transmitting or receiving multiple wireless transmissions. The transceiver 815 may communicate bi-directionally via the one or more antennas 825 using wired or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable, or processor-executable code, such as the code 835. The code 835 may include instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may include, among other things, a basic I/O system (BIOS) which may control basic hardware or software operation such as the interaction with peripheral components or devices.

The at least one processor 840 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting techniques for applying systematic polar codes for JSCC). For example, the device 805 or a component of the device 805 may include at least one processor 840 and at least one memory 830 coupled with or to the at least one processor 840, the at least one processor 840 and the at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions described herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. For example, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code 835 (e.g., processor-executable code) stored in the at least one memory 830 or otherwise, to perform one or more of the functions described herein.

The communications manager 820 may support wireless communications in accordance with examples as disclosed herein. For example, the communications manager 820 is capable of, configured to, or operable to support a means for communicating, with a second wireless device, a control signal indicating a systematic polar code configuration, the systematic polar code configuration indicating for the first wireless device to perform systematic polar encoding on a first set of multiple bits associated with a non-uniform bit distribution. The communications manager 820 is capable of, configured to, or operable to support a means for applying a systematic polar code to the first set of multiple bits to generate a systematic polar codeword based on the systematic polar code configuration, the systematic polar codeword including a set of multiple parity bits and a set of multiple systematic bits. The communications manager 820 is capable of, configured to, or operable to support a means for transmitting at least the set of multiple parity bits of the systematic polar codeword.

Additionally, or alternatively, the communications manager 820 may support wireless communications in accordance with examples as disclosed herein. For example, the communications manager 820 is capable of, configured to, or operable to support a means for communicating, with a first wireless device, a control signal indicating a systematic polar code configuration, the systematic polar code configuration indicating for the first wireless device to perform systematic polar encoding on a first set of multiple bits associated with a non-uniform bit distribution. The communications manager 820 is capable of, configured to, or operable to support a means for receiving at least a set of multiple parity bits of a systematic polar codeword, where the set of multiple parity bits are based on the first set of multiple bits associated with the non-uniform bit distribution. The communications manager 820 is capable of, configured to, or operable to support a means for decoding the set of multiple parity bits to identify the first set of multiple bits of the systematic polar codeword.

By including or configuring the communications manager 820 in accordance with examples as described herein, the device 805 may support techniques for applying systematic polar codewords for source coding, which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of techniques for applying systematic polar codes for JSCC as described herein, or the at least one processor 840 and the at least one memory 830 may be otherwise configured to, individually or collectively, perform or support such operations.

Figure 9:
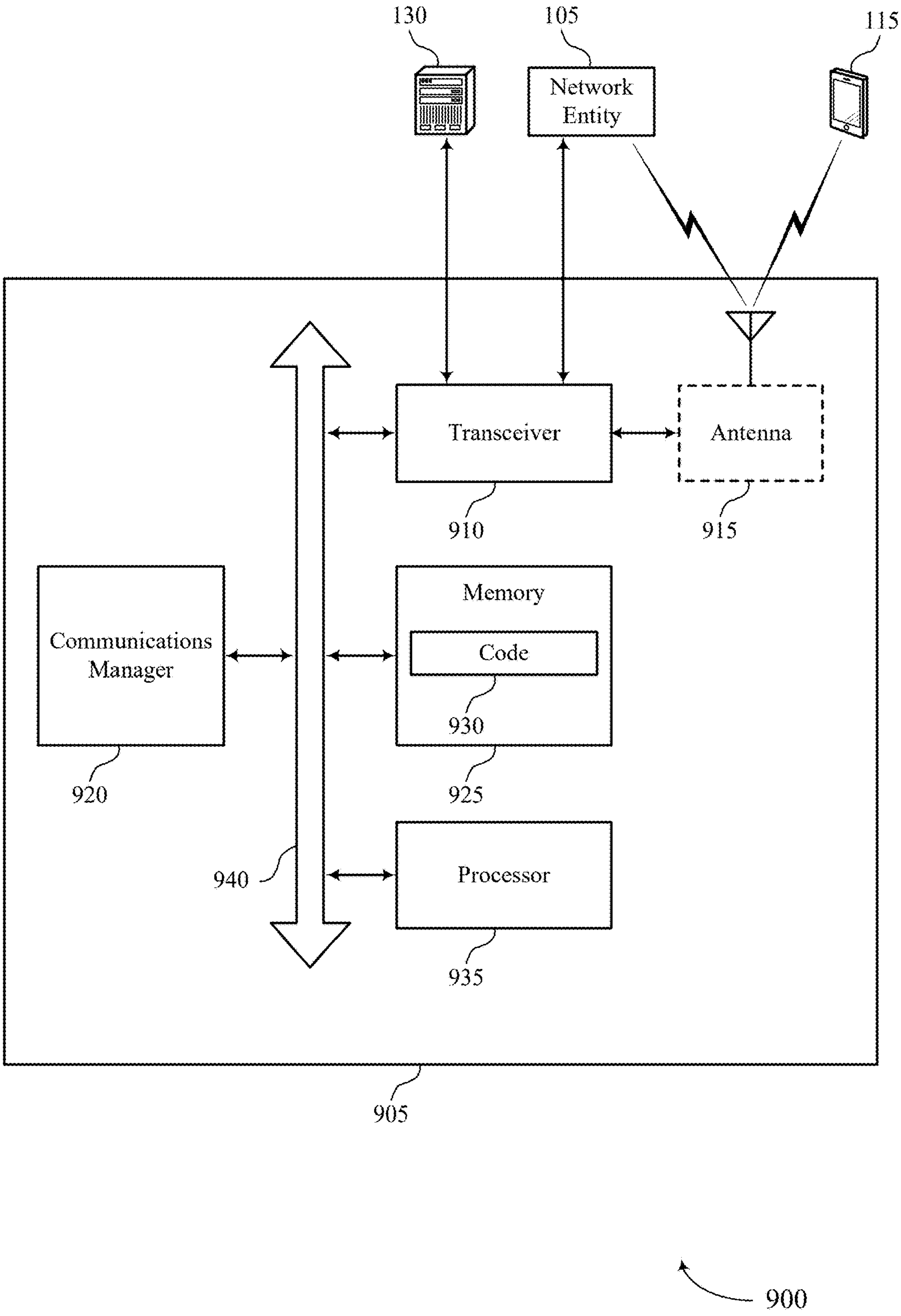
FIG. 9 shows a diagram of a system including a network entity that supports techniques for applying systematic polar codes for JSCC in accordance with one or more aspects of the present disclosure.

FIG. 9 shows a diagram of a system 900 including a device 905 that supports techniques for applying systematic polar codes for JSCC in accordance with one or more aspects of the present disclosure. The device 905 may be an example of or include components of a device 505, a device 605, or a network entity 105 as described herein. The device 905 may communicate with other network devices or network equipment such as one or more of the network entities 105, UEs 115, or any combination thereof. The communications may include communications over one or more wired interfaces, over one or more wireless interfaces, or any combination thereof. The device 905 may include components that support outputting and obtaining communications, such as a communications manager 920, a transceiver 910, one or more antennas 915, at least one memory 925, code 930, and at least one processor 935. These components may be in electronic communication or otherwise coupled (e.g., operatively, communicatively, functionally, electronically, electrically) via one or more buses (e.g., a bus 940).

The transceiver 910 may support bi-directional communications via wired links, wireless links, or both as described herein. In some examples, the transceiver 910 may include a wired transceiver and may communicate bi-directionally with another wired transceiver. Additionally, or alternatively, in some examples, the transceiver 910 may include a wireless transceiver and may communicate bi-directionally with another wireless transceiver. In some examples, the device 905 may include one or more antennas 915, which may be capable of transmitting or receiving wireless transmissions (e.g., concurrently). The transceiver 910 may also include a modem to modulate signals, to provide the modulated signals for transmission (e.g., by one or more antennas 915, by a wired transmitter), to receive modulated signals (e.g., from one or more antennas 915, from a wired receiver), and to demodulate signals. In some implementations, the transceiver 910 may include one or more interfaces, such as one or more interfaces coupled with the one or more antennas 915 that are configured to support various receiving or obtaining operations, or one or more interfaces coupled with the one or more antennas 915 that are configured to support various transmitting or outputting operations, or a combination thereof. In some implementations, the transceiver 910 may include or be configured for coupling with one or more processors or one or more memory components that are operable to perform or support operations based on received or obtained information or signals, or to generate information or other signals for transmission or other outputting, or any combination thereof. In some implementations, the transceiver 910, or the transceiver 910 and the one or more antennas 915, or the transceiver 910 and the one or more antennas 915 and one or more processors or one or more memory components (e.g., the at least one processor 935, the at least one memory 925, or both), may be included in a chip or chip assembly that is installed in the device 905. In some examples, the transceiver 910 may be operable to support communications via one or more communications links (e.g., communication link(s) 125, backhaul communication link(s) 120, a midhaul communication link 162, a fronthaul communication link 168).

The at least one memory 925 may include RAM, ROM, or any combination thereof. The at least one memory 925 may store computer-readable, computer-executable, or processor-executable code, such as the code 930. The code 930 may include instructions that, when executed by one or more of the at least one processor 935, cause the device 905 to perform various functions described herein. The code 930 may be stored in a non-transitory computer-readable medium such as system memory or another type of memory. In some cases, the code 930 may not be directly executable by a processor of the at least one processor 935 but may cause a computer (e.g., when compiled and executed) to perform functions described herein. In some cases, the at least one memory 925 may include, among other things, a BIOS which may control basic hardware or software operation such as the interaction with peripheral components or devices. In some examples, the at least one processor 935 may include multiple processors and the at least one memory 925 may include multiple memories. One or more of the multiple processors may be coupled with one or more of the multiple memories which may, individually or collectively, be configured to perform various functions herein (for example, as part of a processing system).

The at least one processor 935 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 935 may be configured to operate a memory array using a memory controller. In some other cases, a memory controller may be integrated into one or more of the at least one processor 935. The at least one processor 935 may be configured to execute computer-readable instructions stored in a memory (e.g., one or more of the at least one memory 925) to cause the device 905 to perform various functions (e.g., functions or tasks supporting techniques for applying systematic polar codes for JSCC). For example, the device 905 or a component of the device 905 may include at least one processor 935 and at least one memory 925 coupled with one or more of the at least one processor 935, the at least one processor 935 and the at least one memory 925 configured to perform various functions described herein. The at least one processor 935 may be an example of a cloud-computing platform (e.g., one or more physical nodes and supporting software such as operating systems, virtual machines, or container instances) that may host the functions (e.g., by executing code 930) to perform the functions of the device 905. The at least one processor 935 may be any one or more suitable processors capable of executing scripts or instructions of one or more software programs stored in the device 905 (such as within one or more of the at least one memory 925). In some examples, the at least one processor 935 may include multiple processors and the at least one memory 925 may include multiple memories. One or more of the multiple processors may be coupled with one or more of the multiple memories, which may, individually or collectively, be configured to perform various functions herein. In some examples, the at least one processor 935 may be a component of a processing system, which may refer to a system (such as a series) of machines, circuitry (including, for example, one or both of processor circuitry (which may include the at least one processor 935) and memory circuitry (which may include the at least one memory 925)), or components, that receives or obtains inputs and processes the inputs to produce, generate, or obtain a set of outputs. The processing system may be configured to perform one or more of the functions described herein. For example, the at least one processor 935 or a processing system including the at least one processor 935 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 925 or otherwise, to perform one or more of the functions described herein.

In some examples, a bus 940 may support communications of (e.g., within) a protocol layer of a protocol stack. In some examples, a bus 940 may support communications associated with a logical channel of a protocol stack (e.g., between protocol layers of a protocol stack), which may include communications performed within a component of the device 905, or between different components of the device 905 that may be co-located or located in different locations (e.g., where the device 905 may refer to a system in which one or more of the communications manager 920, the transceiver 910, the at least one memory 925, the code 930, and the at least one processor 935 may be located in one of the different components or divided between different components).

In some examples, the communications manager 920 may manage aspects of communications with a core network 130 (e.g., via one or more wired or wireless backhaul links). For example, the communications manager 920 may manage the transfer of data communications for client devices, such as one or more UEs 115. In some examples, the communications manager 920 may manage communications with one or more other network devices 105, and may include a controller or scheduler for controlling communications with UEs 115 (e.g., in cooperation with the one or more other network devices). In some examples, the communications manager 920 may support an X2 interface within an LTE/LTE-A wireless communications network technology to provide communication between network entities 105.

The communications manager 920 may support wireless communications in accordance with examples as disclosed herein. For example, the communications manager 920 is capable of, configured to, or operable to support a means for communicating, with a second wireless device, a control signal indicating a systematic polar code configuration, the systematic polar code configuration indicating for the first wireless device to perform systematic polar encoding on a first set of multiple bits associated with a non-uniform bit distribution. The communications manager 920 is capable of, configured to, or operable to support a means for applying a systematic polar code to the first set of multiple bits to generate a systematic polar codeword based on the systematic polar code configuration, the systematic polar codeword including a set of multiple parity bits and a set of multiple systematic bits. The communications manager 920 is capable of, configured to, or operable to support a means for transmitting at least the set of multiple parity bits of the systematic polar codeword.

Additionally, or alternatively, the communications manager 920 may support wireless communications in accordance with examples as disclosed herein. For example, the communications manager 920 is capable of, configured to, or operable to support a means for communicating, with a first wireless device, a control signal indicating a systematic polar code configuration, the systematic polar code configuration indicating for the first wireless device to perform systematic polar encoding on a first set of multiple bits associated with a non-uniform bit distribution. The communications manager 920 is capable of, configured to, or operable to support a means for receiving at least a set of multiple parity bits of a systematic polar codeword, where the set of multiple parity bits are based on the first set of multiple bits associated with the non-uniform bit distribution. The communications manager 920 is capable of, configured to, or operable to support a means for decoding the set of multiple parity bits to identify the first set of multiple bits of the systematic polar codeword.

By including or configuring the communications manager 920 in accordance with examples as described herein, the device 905 may support techniques for applying systematic polar codewords for source coding, which may result in improved communication reliability, reduced latency, improved user experience related to reduced processing, reduced power consumption, more efficient utilization of communication resources, improved coordination between devices, longer battery life, improved utilization of processing capability, among other advantages.

In some examples, the communications manager 920 may be configured to perform various operations (e.g., receiving, obtaining, monitoring, outputting, transmitting) using or otherwise in cooperation with the transceiver 910, the one or more antennas 915 (e.g., where applicable), or any combination thereof. Although the communications manager 920 is illustrated as a separate component, in some examples, one or more functions described with reference to the communications manager 920 may be supported by or performed by the transceiver 910, one or more of the at least one processor 935, one or more of the at least one memory 925, the code 930, or any combination thereof (for example, by a processing system including at least a portion of the at least one processor 935, the at least one memory 925, the code 930, or any combination thereof). For example, the code 930 may include instructions executable by one or more of the at least one processor 935 to cause the device 905 to perform various aspects of techniques for applying systematic polar codes for JSCC as described herein, or the at least one processor 935 and the at least one memory 925 may be otherwise configured to, individually or collectively, perform or support such operations.

Figure 10:
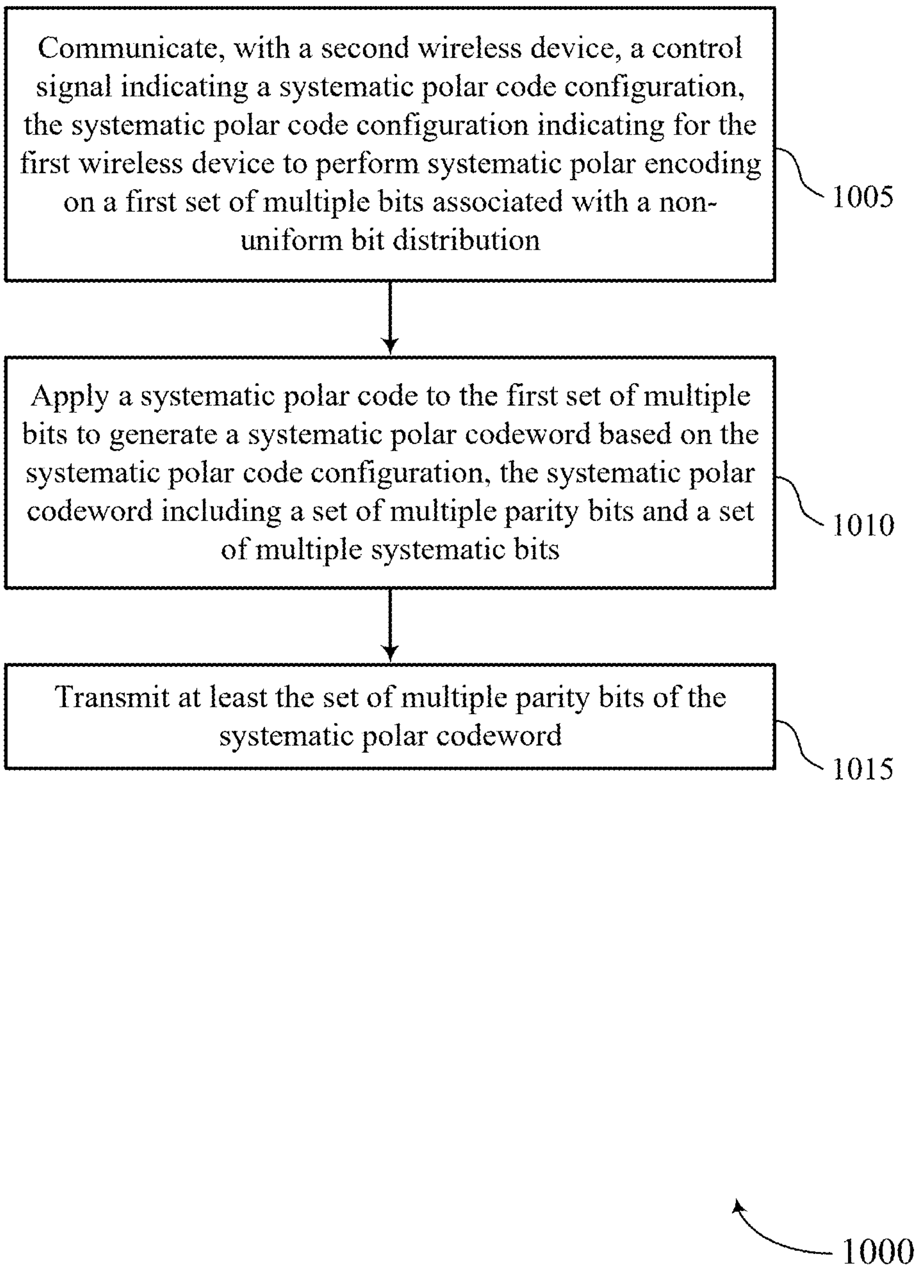
FIGS. 10 through 13 show flowcharts illustrating methods that support techniques for applying systematic polar codes for JSCC in accordance with one or more aspects of the present disclosure.

FIG. 10 shows a flowchart illustrating a method 1000 that supports techniques for applying systematic polar codes for JSCC in accordance with one or more aspects of the present disclosure. The operations of the method 1000 may be implemented by a UE or a network entity or its components as described herein. For example, the operations of the method 1000 may be performed by a UE 115 or a network entity as described with reference to FIGS. 1 through 9. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1005, the method may include communicating, with a second wireless device, a control signal indicating a systematic polar code configuration, the systematic polar code configuration indicating for the first wireless device to perform systematic polar encoding on a first set of multiple bits associated with a non-uniform bit distribution. The operations of 1005 may be performed in accordance with examples as disclosed herein. In some examples, aspects of the operations of 1005 may be performed by a configuration component 725 as described with reference to FIG. 7.

At 1010, the method may include applying a systematic polar code to the first set of multiple bits to generate a systematic polar codeword based on the systematic polar code configuration, the systematic polar codeword including a set of multiple parity bits and a set of multiple systematic bits. The operations of 1010 may be performed in accordance with examples as disclosed herein. In some examples, aspects of the operations of 1010 may be performed by a polar encoding component 730 as described with reference to FIG. 7.

At 1015, the method may include transmitting at least the set of multiple parity bits of the systematic polar codeword. The operations of 1015 may be performed in accordance with examples as disclosed herein. In some examples, aspects of the operations of 1015 may be performed by a codeword component 735 as described with reference to FIG. 7.

Figure 11:
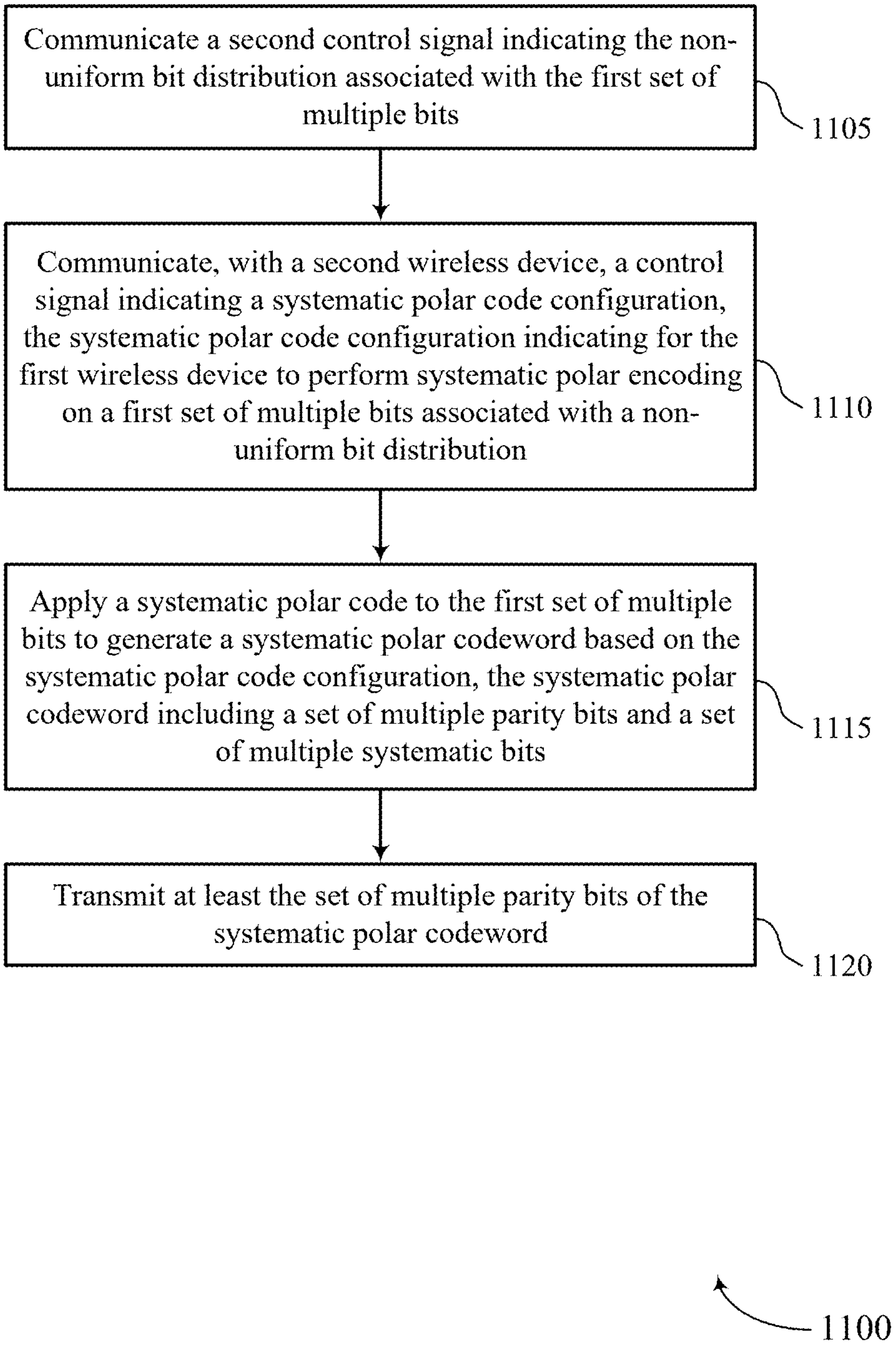

FIG. 11 shows a flowchart illustrating a method 1100 that supports techniques for applying systematic polar codes for JSCC in accordance with one or more aspects of the present disclosure. The operations of the method 1100 may be implemented by a UE or a network entity or its components as described herein. For example, the operations of the method 1100 may be performed by a UE 115 or a network entity as described with reference to FIGS. 1 through 9. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1105, the method may include communicating a second control signal indicating the non-uniform bit distribution associated with the first set of multiple bits. The operations of 1105 may be performed in accordance with examples as disclosed herein. In some examples, aspects of the operations of 1105 may be performed by a configuration component 725 as described with reference to FIG. 7.

At 1110, the method may include communicating, with a second wireless device, a control signal indicating a systematic polar code configuration, the systematic polar code configuration indicating for the first wireless device to perform systematic polar encoding on a first set of multiple bits associated with a non-uniform bit distribution. The operations of 1110 may be performed in accordance with examples as disclosed herein. In some examples, aspects of the operations of 1110 may be performed by a configuration component 725 as described with reference to FIG. 7.

At 1115, the method may include applying a systematic polar code to the first set of multiple bits to generate a systematic polar codeword based on the systematic polar code configuration, the systematic polar codeword including a set of multiple parity bits and a set of multiple systematic bits. The operations of 1115 may be performed in accordance with examples as disclosed herein. In some examples, aspects of the operations of 1115 may be performed by a polar encoding component 730 as described with reference to FIG. 7.

At 1120, the method may include transmitting at least the set of multiple parity bits of the systematic polar codeword. The operations of 1120 may be performed in accordance with examples as disclosed herein. In some examples, aspects of the operations of 1120 may be performed by a codeword component 735 as described with reference to FIG. 7.

Figure 12:
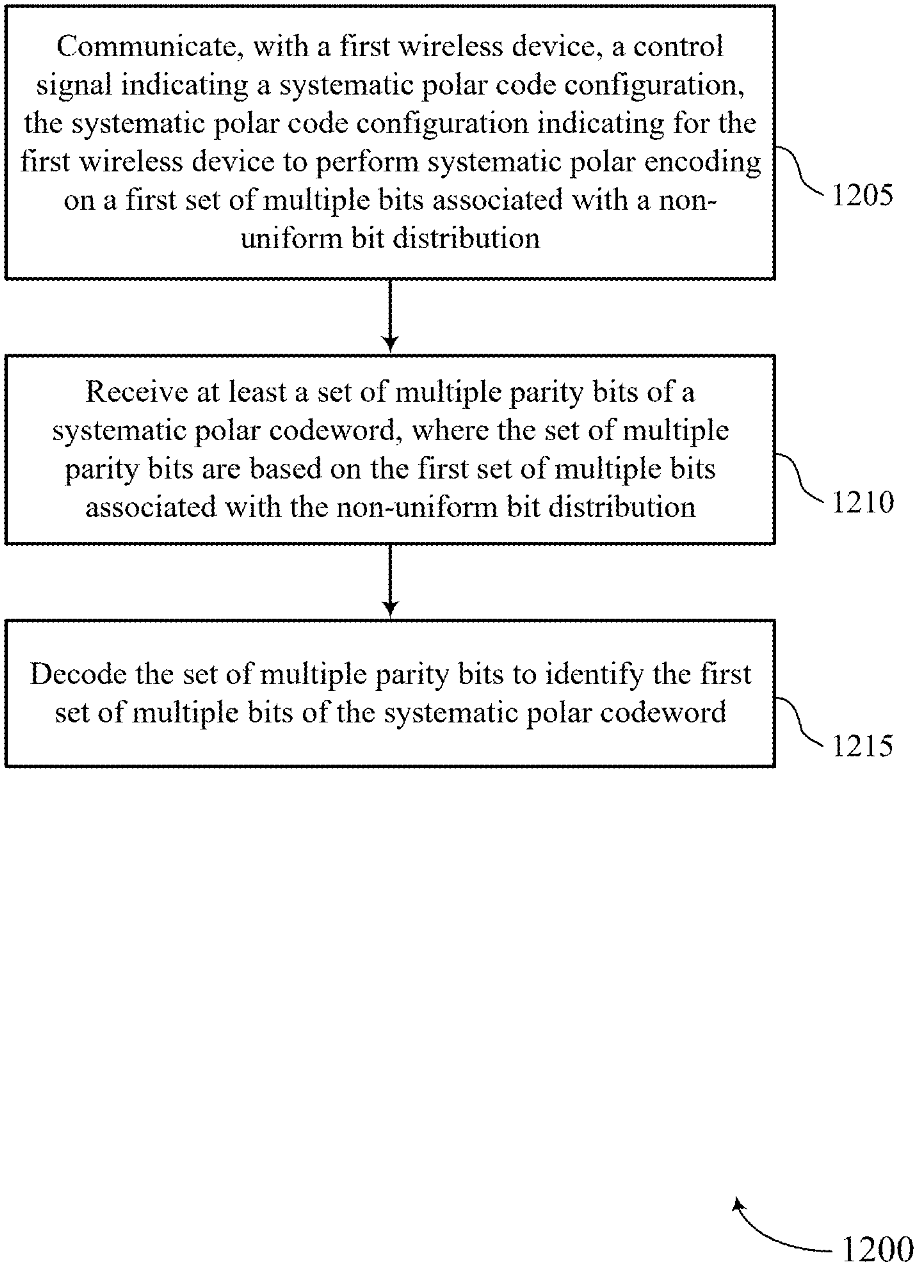

FIG. 12 shows a flowchart illustrating a method 1200 that supports techniques for applying systematic polar codes for JSCC in accordance with one or more aspects of the present disclosure. The operations of the method 1200 may be implemented by a UE or a network entity or its components as described herein. For example, the operations of the method 1200 may be performed by a UE 115 or a network entity as described with reference to FIGS. 1 through 9. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1205, the method may include communicating, with a first wireless device, a control signal indicating a systematic polar code configuration, the systematic polar code configuration indicating for the first wireless device to perform systematic polar encoding on a first set of multiple bits associated with a non-uniform bit distribution. The operations of 1205 may be performed in accordance with examples as disclosed herein. In some examples, aspects of the operations of 1205 may be performed by a configuration component 725 as described with reference to FIG. 7.

At 1210, the method may include receiving at least a set of multiple parity bits of a systematic polar codeword, where the set of multiple parity bits are based on the first set of multiple bits associated with the non-uniform bit distribution. The operations of 1210 may be performed in accordance with examples as disclosed herein. In some examples, aspects of the operations of 1210 may be performed by a codeword component 735 as described with reference to FIG. 7.

At 1215, the method may include decoding the set of multiple parity bits to identify the first set of multiple bits of the systematic polar codeword. The operations of 1215 may be performed in accordance with examples as disclosed herein. In some examples, aspects of the operations of 1215 may be performed by a decoding component 740 as described with reference to FIG. 7.

Figure 13:
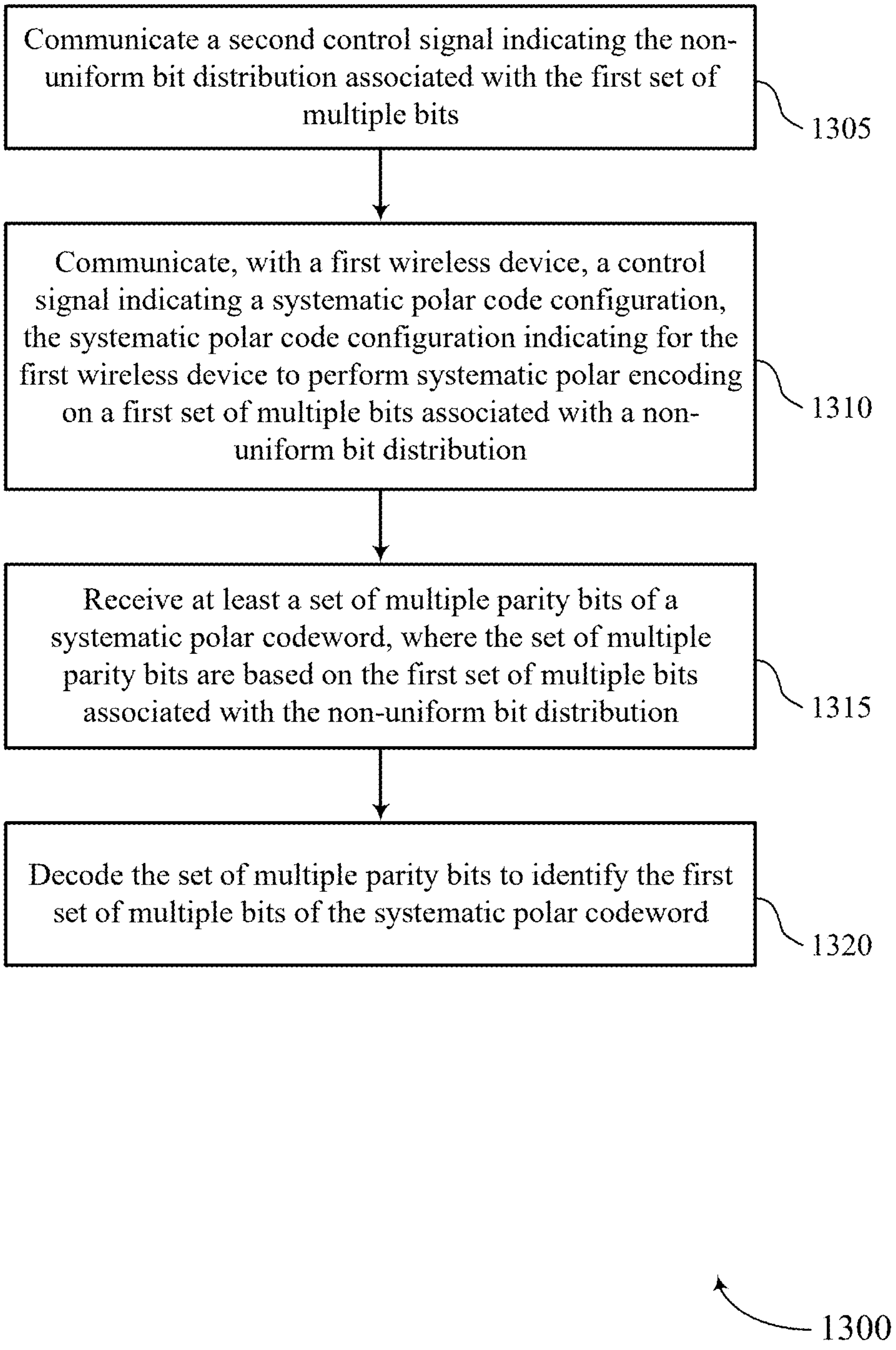

FIG. 13 shows a flowchart illustrating a method 1300 that supports techniques for applying systematic polar codes for JSCC in accordance with one or more aspects of the present disclosure. The operations of the method 1300 may be implemented by a UE or a network entity or its components as described herein. For example, the operations of the method 1300 may be performed by a UE 115 or a network entity as described with reference to FIGS. 1 through 9. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1305, the method may include communicating a second control signal indicating the non-uniform bit distribution associated with the first set of multiple bits. The operations of 1305 may be performed in accordance with examples as disclosed herein. In some examples, aspects of the operations of 1305 may be performed by a configuration component 725 as described with reference to FIG. 7.

At 1310, the method may include communicating, with a first wireless device, a control signal indicating a systematic polar code configuration, the systematic polar code configuration indicating for the first wireless device to perform systematic polar encoding on a first set of multiple bits associated with a non-uniform bit distribution. The operations of 1310 may be performed in accordance with examples as disclosed herein. In some examples, aspects of the operations of 1310 may be performed by a configuration component 725 as described with reference to FIG. 7.

At 1315, the method may include receiving at least a set of multiple parity bits of a systematic polar codeword, where the set of multiple parity bits are based on the first set of multiple bits associated with the non-uniform bit distribution. The operations of 1315 may be performed in accordance with examples as disclosed herein. In some examples, aspects of the operations of 1315 may be performed by a codeword component 735 as described with reference to FIG. 7.

At 1320, the method may include decoding the set of multiple parity bits to identify the first set of multiple bits of the systematic polar codeword. The operations of 1320 may be performed in accordance with examples as disclosed herein. In some examples, aspects of the operations of 1320 may be performed by a decoding component 740 as described with reference to FIG. 7.

The following provides an overview of aspects of the present disclosure:

Aspect 1: A method for wireless communications at a first wireless device, comprising: communicating, with a second wireless device, a control signal indicating a systematic polar code configuration, the systematic polar code configuration indicating for the first wireless device to perform systematic polar encoding on a first plurality of bits associated with a non-uniform bit distribution; applying a systematic polar code to the first plurality of bits to generate a systematic polar codeword based at least in part on the systematic polar code configuration, the systematic polar codeword comprising a plurality of parity bits and a plurality of systematic bits; and transmitting at least the plurality of parity bits of the systematic polar codeword.

Aspect 2: The method of aspect 1, wherein transmitting at least the first plurality of bits comprises: transmitting the systematic polar codeword comprising the plurality of parity bits and the plurality of systematic bits.

Aspect 3: The method of any of aspects 1 through 2, wherein the systematic polar code configuration further indicates for the first wireless device to puncture a first subset of the plurality of systematic bits of the systematic polar codeword, the method further comprising: puncturing the first subset of the plurality of systematic bits from the systematic polar codeword based at least in part on the systematic polar code configuration, wherein the plurality of parity bits and a second subset of the plurality of systematic bits of the systematic polar codeword are transmitted based at least in part on the first subset of the plurality of systematic bits being punctured from the systematic polar codeword.

Aspect 4: The method of aspect 3, wherein the systematic polar code configuration indicates for the first wireless device to puncture all of the plurality of systematic bits, and the plurality of parity bits are transmitted based at least in part on the plurality of systematic bits being punctured from the systematic polar codeword in accordance with the systematic polar code configuration.

Aspect 5: The method of any of aspects 3 through 4, wherein the systematic polar code configuration further indicates for the first wireless device to puncture the first subset of the plurality of systematic bits associated with a first level of non-uniform bit distribution satisfying a threshold level of non-uniform bit distribution, and the plurality of parity bits and a second subset of the plurality of systematic bits are transmitted based at least in part on the first subset of the plurality of systematic bits being punctured from the systematic polar codeword in accordance with the systematic polar code configuration, the second subset of the plurality of systematic bits are associated with a second level of non-uniform bit distribution that does not satisfy the threshold level of non-uniform bit distribution.

Aspect 6: The method of aspect 5, wherein the first subset of the plurality of systematic bits are associated with control information.

Aspect 7: The method of any of aspects 5 through 6, wherein the systematic polar code configuration further indicates one or more fields of control information, a type of control information, or both, to puncture, and the first subset of the plurality of systematic bits are associated with the one or more fields, the type of control information, or both.

Aspect 8: The method of aspect 7, wherein the one or more fields comprise a modulation and encoding scheme field, a time domain resource allocation field, a frequency domain resource allocation field, a rank field, a precoding matrix indicator field, or any combination thereof.

Aspect 9: The method of any of aspects 3 through 8, wherein one or more cyclic redundancy check bits associated with the plurality of parity bits are not punctured from the systematic polar codeword based at least in part on the systematic polar code configuration.

Aspect 10: The method of any of aspects 1 through 9, further comprising: communicating a second control signal indicating the non-uniform bit distribution associated with the first plurality of bits.

Aspect 11: The method of aspect 10, wherein the non-uniform bit distribution is based at least in part on residual redundancy after source coding at an application layer of the first wireless device.

Aspect 12: A method for wireless communications at a second wireless device, comprising: communicating, with a first wireless device, a control signal indicating a systematic polar code configuration, the systematic polar code configuration indicating for the first wireless device to perform systematic polar encoding on a first plurality of bits associated with a non-uniform bit distribution; receiving at least a plurality of parity bits of a systematic polar codeword, wherein the plurality of parity bits are based at least in part on the first plurality of bits associated with the non-uniform bit distribution; and decoding the plurality of parity bits to identify the first plurality of bits of the systematic polar codeword.

Aspect 13: The method of aspect 12, wherein decoding the systematic polar codeword is based at least in part on a first LLR associated with the plurality of parity bits and a second LLR associated with at least a first subset of a plurality of systematic bits, the at least first subset of the plurality of systematic bits based at least in part on the systematic polar code configuration.

Aspect 14: The method of any of aspects 12 through 13, wherein the first LLR associated with the plurality of parity bits is based at least in part on a channel LLR of a channel used to receive the systematic polar codeword.

Aspect 15: The method of any of aspects 12 through 14, wherein receiving at least the first plurality of bits comprises: receiving the systematic polar codeword comprising the plurality of parity bits and a plurality of systematic bits.

Aspect 16: The method of aspect 15, wherein decoding the systematic polar codeword comprises: decoding the systematic polar codeword to identify the first plurality of bits based at least in part on a first LLR associated with the plurality of parity bits and a second LLR associated with the plurality of systematic bits.

Aspect 17: The method of any of aspects 15 through 16, wherein the second LLR associated with the plurality of systematic bits is based at least in part on a ratio of a first probability of a first potential value of each of the plurality of systematic bits relative to a second probability of a second potential value of each of the plurality of systematic bits.

Aspect 18: The method of any of aspects 12 through 17, wherein the systematic polar code configuration further indicates for the first wireless device to puncture a plurality of systematic bits, the plurality of systematic bits are based at least in part on the systematic polar code configuration, and decoding the systematic polar codeword is based at least in part on a first LLR associated with the plurality of parity bits and a second LLR associated with the plurality of systematic bits.

Aspect 19: The method of aspect 18, wherein the second LLR associated with the plurality of systematic bits is based at least in part on a ratio of a first probability of a first potential value of each of the plurality of systematic bits relative to a second probability of a second potential value of each of the plurality of systematic bits.

Aspect 20: The method of any of aspects 12 through 19, wherein the systematic polar code configuration further indicates for the first wireless device to puncture a first subset of a plurality of systematic bits associated with a first level of non-uniform bit distribution satisfying a threshold level of non-uniform bit distribution, wherein the plurality of systematic bits are based at least in part on the systematic polar code configuration, and wherein receiving at least the first plurality of bits comprises: receiving the systematic polar codeword comprising the plurality of parity bits and a second subset of the plurality of systematic bits, wherein the second subset of the plurality of systematic bits are associated with a second level of non-uniform bit distribution that does not satisfy the threshold level of non-uniform bit distribution.

Aspect 21: The method of aspect 20, wherein decoding the systematic polar codeword is based at least in part on a first LLR associated with the plurality of parity bits and a second LLR associated with the first subset of the plurality of systematic bits.

Aspect 22: The method of any of aspects 20 through 21, wherein the second LLR associated with the first subset of the plurality of systematic bits is based at least in part on a ratio of a first probability of a first potential value of each of the first subset of the plurality of systematic bits relative to a second probability of a second potential value of each of the first subset of the plurality of systematic bits.

Aspect 23: The method of any of aspects 20 through 22, wherein the first subset of the plurality of systematic bits are associated with control information.

Aspect 24: The method of any of aspects 20 through 23, wherein the systematic polar code configuration further indicates one or more fields of control information, a type of control information, or both, to puncture, and the first subset of the plurality of systematic bits are associated with the one or more fields, the type of control information, or both.

Aspect 25: The method of aspect 24, wherein the one or more fields comprise a modulation and encoding scheme field, a time domain resource allocation field, a frequency domain resource allocation field, a rank field, a precoding matrix indicator field, or any combination thereof.

Aspect 26: The method of any of aspects 12 through 25, further comprising: communicating a second control signal indicating the non-uniform bit distribution associated with the first plurality of bits.

Aspect 27: The method of aspect 26, wherein the non-uniform bit distribution is based at least in part on residual redundancy after source coding at an application layer of the first wireless device.

Aspect 28: A first wireless device for wireless communications, comprising one or more memories storing processor-executable code, and one or more processors coupled with the one or more memories and individually or collectively operable to execute the code to cause the first wireless device to perform a method of any of aspects 1 through 11.

Aspect 29: A first wireless device for wireless communications, comprising at least one means for performing a method of any of aspects 1 through 11.

Aspect 30: A non-transitory computer-readable medium storing code for wireless communications, the code comprising instructions executable by one or more processors to perform a method of any of aspects 1 through 11.

Aspect 31: A second wireless device for wireless communications, comprising one or more memories storing processor-executable code, and one or more processors coupled with the one or more memories and individually or collectively operable to execute the code to cause the second wireless device to perform a method of any of aspects 12 through 27.

Aspect 32: A second wireless device for wireless communications, comprising at least one means for performing a method of any of aspects 12 through 27.

Aspect 33: A non-transitory computer-readable medium storing code for wireless communications, the code comprising instructions executable by one or more processors to perform a method of any of aspects 12 through 27.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first wireless device, comprising:

one or more memories storing processor-executable code; and one or more processors coupled with the one or more memories and individually or collectively operable to execute the code to cause the first wireless device to:

communicate, with a second wireless device, a control signal indicating a systematic polar code configuration, the systematic polar code configuration indicating for the first wireless device to perform systematic polar encoding on a first plurality of bits associated with a non-uniform bit distribution, wherein, in accordance with the non-uniform bit distribution, a first value of a bit of the first plurality of bits is associated with a higher probability of occurrence than a second value of the bit;

apply a systematic polar code to the first plurality of bits to generate a systematic polar codeword based at least in part on the systematic polar code configuration, the systematic polar codeword comprising a plurality of parity bits and a plurality of systematic bits; and transmit the plurality of parity bits and a first subset of the plurality of systematic bits of the systematic polar codeword in accordance with the first subset of the plurality of systematic bits being associated with a first level of non-uniform bit distribution that does not satisfy a threshold level of non-uniform bit distribution.

2. The first wireless device of claim 1, wherein, to transmit the plurality of parity bits and the first subset of the plurality of systematic bits, the one or more processors are individually or collectively operable to execute the code to cause the first wireless device to:

transmit the systematic polar codeword comprising the plurality of parity bits and the plurality of systematic bits.

3. The first wireless device of claim 1, wherein the systematic polar code configuration further indicates for the first wireless device to puncture a second subset of the plurality of systematic bits of the systematic polar codeword, and the one or more processors are individually or collectively further operable to execute the code to cause the first wireless device to:

puncture the second subset of the plurality of systematic bits from the systematic polar codeword based at least in part on the systematic polar code configuration, wherein the plurality of parity bits and the first subset of the plurality of systematic bits of the systematic polar codeword are transmitted based at least in part on the second subset of the plurality of systematic bits being punctured from the systematic polar codeword.

4. The first wireless device of claim 3, wherein the systematic polar code configuration further indicates for the first wireless device to puncture the second subset of the plurality of systematic bits associated with a second level of non-uniform bit distribution satisfying the threshold level of non-uniform bit distribution, wherein the plurality of parity bits and the first subset of the plurality of systematic bits are transmitted based at least in part on the second subset of the plurality of systematic bits being punctured from the systematic polar codeword in accordance with the systematic polar code configuration.

5. The first wireless device of claim 4, wherein the second subset of the plurality of systematic bits are associated with control information.

6. The first wireless device of claim 4, wherein the systematic polar code configuration further indicates one or more fields of control information, a type of control information, or both, to puncture, and wherein the second subset of the plurality of systematic bits are associated with the one or more fields, the type of control information, or both.

7. The first wireless device of claim 1, wherein the one or more processors are individually or collectively further operable to execute the code to cause the first wireless device to:

communicate a second control signal indicating the non-uniform bit distribution associated with the first plurality of bits.

8. A second wireless device, comprising:

one or more memories storing processor-executable code; and one or more processors coupled with the one or more memories and individually or collectively operable to execute the code to cause the second wireless device to:

communicate, with a first wireless device, a control signal indicating a systematic polar code configuration, the systematic polar code configuration indicating for the first wireless device to perform systematic polar encoding on a first plurality of bits associated with a non-uniform bit distribution, wherein, in accordance with the non-uniform bit distribution, a first value of a bit of the first plurality of bits is associated with a higher probability of occurrence than a second value of the bit;

receive a plurality of parity bits and a first subset of a plurality of systematic bits of a systematic polar codeword in accordance with the first subset of the plurality of systematic bits being associated with a first level of non-uniform bit distribution that does not satisfy a threshold level of non-uniform bit distribution, wherein the plurality of parity bits are based at least in part on the first plurality of bits associated with the non-uniform bit distribution; and decode the plurality of parity bits to identify the first plurality of bits of the systematic polar codeword.

9. The second wireless device of claim 8, wherein decoding the systematic polar codeword is based at least in part on a first log likelihood ratio associated with the plurality of parity bits and a second log likelihood ratio associated with at least a second subset of the plurality of systematic bits, the at least second subset of the plurality of systematic bits based at least in part on the systematic polar code configuration.

10. The second wireless device of claim 9, wherein the first log likelihood ratio associated with the plurality of parity bits is based at least in part on a channel log likelihood ratio of a channel used to receive the systematic polar codeword.

11. The second wireless device of claim 8, wherein, to receive the plurality of parity bits and the first subset of the plurality of systematic bits, the one or more processors are individually or collectively operable to execute the code to cause the second wireless device to:

receive the systematic polar codeword comprising the plurality of parity bits and the plurality of systematic bits.

12. The second wireless device of claim 11, wherein, to decode the systematic polar codeword, the one or more processors are individually or collectively operable to execute the code to cause the second wireless device to:

decode the systematic polar codeword to identify the first plurality of bits based at least in part on a first log likelihood ratio associated with the plurality of parity bits and a second log likelihood ratio associated with the plurality of systematic bits.

13. The second wireless device of claim 8, wherein the systematic polar code configuration further indicates for the first wireless device to puncture a second subset of the plurality of systematic bits associated with a second level of non-uniform bit distribution satisfying the threshold level of non-uniform bit distribution, wherein the plurality of systematic bits are based at least in part on the systematic polar code configuration, and wherein, to receive the first plurality of bits and the first subset of the plurality of systematic bits, the one or more processors are individually or collectively operable to execute the code to cause the second wireless device to:

receive the systematic polar codeword comprising the plurality of parity bits and the first subset of the plurality of systematic bits.

14. The second wireless device of claim 13, wherein decoding the systematic polar codeword is based at least in part on a first log likelihood ratio associated with the plurality of parity bits and a second log likelihood ratio associated with the second subset of the plurality of systematic bits.

15. The second wireless device of claim 13, wherein the second subset of the plurality of systematic bits are associated with control information.

16. The second wireless device of claim 13, wherein the systematic polar code configuration further indicates one or more fields of control information, a type of control information, or both, to puncture, and wherein the second subset of the plurality of systematic bits are associated with the one or more fields, the type of control information, or both.

17. The second wireless device of claim 8, wherein the one or more processors are individually or collectively further operable to execute the code to cause the second wireless device to:

communicate a second control signal indicating the non-uniform bit distribution associated with the first plurality of bits.

18. A method for wireless communications at a first wireless device, comprising:

communicating, with a second wireless device, a control signal indicating a systematic polar code configuration, the systematic polar code configuration indicating for the first wireless device to perform systematic polar encoding on a first plurality of bits associated with a non-uniform bit distribution, wherein, in accordance with the non-uniform bit distribution, a first value of a bit of the first plurality of bits is associated with a higher probability of occurrence than a second value of the bit;

applying a systematic polar code to the first plurality of bits to generate a systematic polar codeword based at least in part on the systematic polar code configuration, the systematic polar codeword comprising a plurality of parity bits and a plurality of systematic bits; and transmitting the plurality of parity bits and a first subset of the plurality of systematic bits of the systematic polar codeword in accordance with the first subset of the plurality of systematic bits being associated with a first level of non-uniform bit distribution that does not satisfy a threshold level of non-uniform bit distribution.

* * * * *